US012738518B2

(12) United States Patent
Dekel

(10) Patent No.: US 12,738,518 B2
(45) Date of Patent: Sep. 15, 2026

(54) HIGH-TEMPERATURE ANION-EXCHANGE MEMBRANE FUEL CELL

(71) Applicant: Technion Research & Development Foundation Limited, Haifa (IL)

(72) Inventor: Dario R. Dekel, Haifa (IL)

(73) Assignee: Technion Research & Development Foundation Limited, Haifa (IL)

(*) Notice: Subject to any disclaimer, the term of this patent is extended or adjusted under 35 U.S.C. 154(b) by 622 days.

(21) Appl. No.: 18/012,672

(22) PCT Filed: Jun. 25, 2021

(86) PCT No.: PCT/IL2021/050782
§ 371 (c)(1),
(2) Date: Dec. 23, 2022

(87) PCT Pub. No.: WO2021/260707
PCT Pub. Date: Dec. 30, 2021

(65) Prior Publication Data
US 2023/0268531 A1 Aug. 24, 2023

Related U.S. Application Data

(60) Provisional application No. 63/044,374, filed on Jun. 26, 2020.

(51) Int. Cl.
*H01M 8/04701* (2016.01)
*H01M 8/04828* (2016.01)
(Continued)

(52) U.S. Cl.
CPC ... *H01M 8/04701* (2013.01); *H01M 8/04828* (2013.01); *H01M 8/04873* (2013.01);
(Continued)

(58) Field of Classification Search
CPC ......... H01M 8/04701; H01M 8/04828; H01M 8/04873; H01M 8/04902; H01M 8/04932;
(Continued)

(56) References Cited

U.S. PATENT DOCUMENTS 10,236,527 B2 * 3/2019 Henkensmeier .... H01M 8/1081
10,944,123 B2 * 3/2021 Dutta .................... H01M 14/00
(Continued)

FOREIGN PATENT DOCUMENTS

IL 260880 A * 11/2019 ........ H01M 8/04701
JP 2011054396 A * 3/2011 ............. Y02E 60/50
(Continued)

OTHER PUBLICATIONS

International Preliminary Report on Patentability Dated Jan. 5, 2023 From the International Bureau of WIPO Re. Application No. PCT/IL2021/050782. (11 Pages).
(Continued)

*Primary Examiner* — Kaity V Chandler

(57) ABSTRACT

Anion exchange membrane electrode assemblies, fuel cells and electrochemical cells comprising such assemblies, which comprise an anion exchange membrane sandwiched between an anode compartment and a cathode compartment, and which are operable at a temperature of at least 100° C., are provided. Systems, devices, articles and methods that utilize such assemblies at an operating temperature of at least 100° C. are also provided.

19 Claims, 16 Drawing Sheets

Figure 1A:
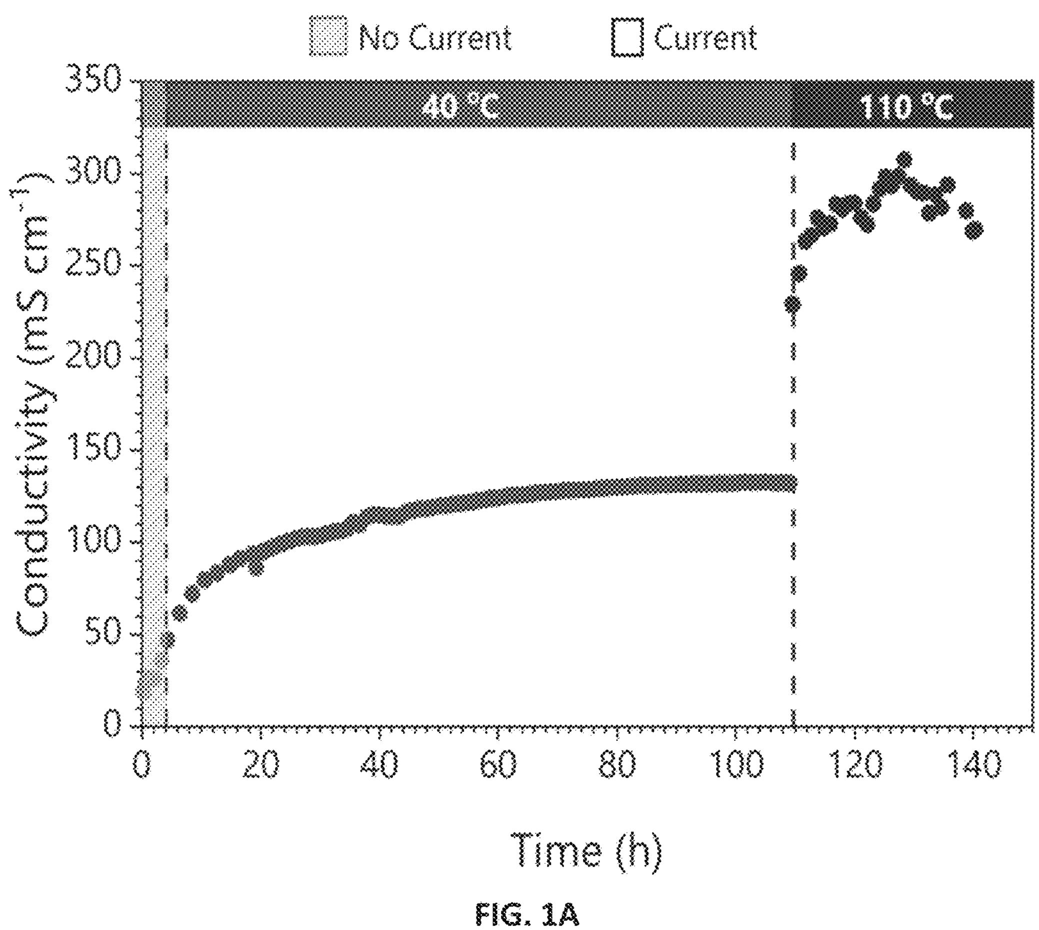

(51) Int. Cl.
*H01M 8/04858* (2016.01)
*H01M 8/1067* (2016.01)
*H01M 8/10* (2016.01)

(52) U.S. Cl.
CPC ... *H01M 8/04902* (2013.01); *H01M 8/04932* (2013.01); *H01M 8/1067* (2013.01); *H01M 2008/1095* (2013.01)

(58) Field of Classification Search
CPC ....... H01M 8/1067; H01M 2008/1095; H01M 12/06; H01M 8/1039; H01M 8/1023; Y02E 60/36; Y02E 60/50; Y02P 20/129; C25B 1/042; C25B 13/08; C25B 1/02; C25B 9/23
See application file for complete search history.

(56) References Cited

U.S. PATENT DOCUMENTS

| | | | | |
|---|---|---|---|---|
| 10,960,354 | B2 * | 3/2021 | Mottet | B01D 61/0021 |
| 11,043,686 | B2 * | 6/2021 | Wang | H01M 8/188 |
| 11,050,078 | B2 * | 6/2021 | Wang | H01M 8/188 |
| 2002/0119368 | A1 * | 8/2002 | Tzeng | H01M 4/12 427/58 |
| 2012/0295172 | A1 * | 11/2012 | Peled | H01M 4/926 204/263 |
| 2020/0091532 | A1 * | 3/2020 | Okamoto | C08G 65/4031 |
| 2020/0384421 | A1 * | 12/2020 | Newbloom | B01D 67/00931 |
| 2020/0388871 | A1 * | 12/2020 | Newbloom | B01D 69/02 |

FOREIGN PATENT DOCUMENTS

| | | | | |
|---|---|---|---|---|
| KR | 2021-0027953 | | 3/2021 | |
| WO | WO-2010096797 | A1 * | 8/2010 | H01M 4/8814 |
| WO | WO-2019030557 | A1 * | 2/2019 | H01M 4/9016 |
| WO | WO 2020/026231 | | 2/2020 | |
| WO | WO 2021/260707 | | 12/2021 | |

OTHER PUBLICATIONS

International Search Report and the Written Opinion Dated Oct. 12, 2012 From the International Searching Authority Re. Application No. PCT/IL2021/050782. (18 Pages).

Bai et al. "Poly(arylene Piperidine)s With Phosphoric Acid Doping as High Temperature Polymer Electrolyte Membrane for Durable, High-Performance Fuel Cells", Journal of Power Sources, 443: 227219-1-227219-9, Published Online Oct. 7, 2019.

Dekel "Review of Cell Performance in Anion Exchange Membrane Fuel Cells", Journal of Power Sources, 375: 158-169, Available Online Aug. 4, 2017.

Dekel et al. "Predicting Performance Stability of Anion Exchange Membrane Fuel Cells", Journal of Power Sources, 420: 118-123, Apr. 30, 2019.

Dekel et al. "Steady State and Transient Simulation of Anion Exchange Membrane Fuel Cells", Journal of Power Sources, 375: 191-204, Jan. 31, 2018.

Douglin et al. "A High-Temperature Anion-Exchange Membrane Fuel Cell", Journal of Power Sources Advances, 5: 100023-1-100023-4, Oct. 2020.

Hagesteijn et al. "A Review of the Synthesis and Characterization of Anion Exchange Membranes", Journal of Materials Science, 53:11131-1150, May 21, 2018.

Huang et al. "Composite Poly(Norbornene) Anion Conducting Membranes for Achieving Durability, Water Management and High Power (3,4 W/cm2) in Hydrogen/Oxygen Alkaline Fuel Cells", Journal of The Electrochemical Society, 166(10): F637-F644, Published Online Jun. 24, 2019.

Kim et al. "Biomass-Derived Air Cathode Materials: Pore-Controlled S,N—Co-Doped Carbon for Fuel Cells and Metal-Air Batteries", ACS Catalysis, 9(4): 3389-3398, Mar. 6, 2019.

Kim et al. "Facile and Gram-Scale Synthesis of Metal-Free Catalysts: Toward Realistic Applications for Fuel Cells". Scientific Reports, 5: 8376-1-8376-8, Mar. 2, 2015.

Kim et al. "Ionic Highways From Covalent Assembly in Highly Conducting and Stable Anion Exchange Membrane Fuel Cells", Journal of the American Chemical Society, 141(45): 18152-18159, Published Online Nov. 4, 2019.

Klingele et al. "Sulfur Doped Reduced Graphene Oxide as Metal-Free Catalyst for the Oxygen Reduction Reaction in Anion and Proton Exchange Fuel Cells", Electrochemistry Commununications. 77: 71-75, Apr. 2017.

Lee et al. "Designing A Highly Active Metal-Free Oxygen Reduction Catalyst in Membrane Electrode Assemblies for Alkaline Fuel Cells: Effects of Pore Size and Doping-Site Position", Angewandte Chemie International Edition, 54(32): 9230-9234, Published Online Jun. 18, 2015.

Lee et al. "Highly Conductive and Durable Poly(Arylene Ether Sulfone) Anion Exchange Membrane With End-Group Cross-Linking", Energy & Environmental Science, 10(1): 275-285, Published Online Dec. 2, 2016.

Lilloja et al. "Nitrogen-Doped Carbide-Derived Carbon/Carbon Nnanotube Composites as Cathode Catalysts for Anion Exchange Membrane Fuel Cell Application", Applied Catalysis B: Environmental, 272: 119012-1-119012-10, Published Online Apr. 12, 2020.

Lu et al. "Chemically Stable Poly(Meta-Terphenyl Piperidinium) With Highly Conductive Side Chain for Alkaline Fuel Cell Membranes", Journal of Membrane Science, 598: 117797-1-117797-10, Published Online Dec. 27, 2019.

Lu et al. "Hallosyte-Derived Nitrogen Doped Carbon Electrocatalysts for Anion Exchange Membrane Fuell Cells", Journal of Power Sources, 372: 82-90, Published Online Nov. 5, 2017.

Mandal et al. "The Importance of Water Transport in High Conductivity and High-Power Alkaline Fuel Cells", Journal of The Electrochemical Society, 167(5):054501-1-054501-11, Oct. 9, 2020.

Park et al. "How Does a Small Structural Change of Anode Ionomer Make a Big Difference in Alkaline Membrane Fuel Cell Performance? ", Journal of Materials Chemistry A, 7(43): 25040-25046, Published Online Oct. 14, 2019.

Peng et al. "Alkaline Polymer Electrolyte Fuel Cells Stably Working at 80° C.", Journal of Power Sources, 390: 165-167, Jun. 30, 2018.

Pham et al. "Doped, Defect-Enriched Carbon Nanotubes as an Efficient Oxygen Reduction Catalyst for Anion Exchange Membrane Fuel Cells", Advanced Materials Interfaces, 5(12): 1800184-1-1800184-9, Published Online Mar. 7, 2018.

Pham et al. "Tridoped Reduced Graphene Oxide as a Metal-Free Catalyst for Oxygen Reduction Reaction Demonstrated in Acidic and Alkaline Polymer Electrolyte Fuel Cells", Advanced Sustainable Systems, 1(5): 1600038-1-1600038-, Published Online Apr. 18, 2017.

Rosli et al. "A Review of High-Temperature Proton Exchange Membrane Fuel Cell (HT-PEMFC) System", International Journal of Hydrogen Energy, 42(14): 9293-9314, Available Online Jul. 12, 2016.

Santillán-Saldivar et al. "How Recycling Mitigates Supply Risks of Critical Raw Materials: Extension of the Geopolitical Supply Risk Methodology Applied to Information and Communication Technologies in the European Union", Resources, Conservation and Recycling, 164: 105108-1-105108-8, Jan. 2021.

Sun et al. "Composite Membranes for High Temperature PEM Fuel Cells and Electrolysers: A Critical Review", Membranes, 9(1): 83-1-83-46, Published Online Jul. 11, 2019.

To et al. "High-Performance Oxygen Reduction and Evolution Carbon Catalysis: From Mechanistic Studies to Device Integration", Nano Research, 10(4): 1163-1177, Published Online Nov. 30, 2016.

Tong et al. "Nitrogen-Doped Hollow Carbon Spheres as Highly Effective Multifunctional Electrocatalysts for Fuel Cells, Zn-Air Batteries, and Water-Splitting Electrolyzers", Journal of Power Sources, 441: 227166-1-227166-11, Published Online Sep. 19, 2019.

Truong "Effects of Cell Temperature and Reactant Humidification on Anion Exchange Membrane Fuel Cells", Materials, 12(13),2048:11P., Jun. 26, 2019.

(56) References Cited

OTHER PUBLICATIONS

Unni et al. "Nitrogen-Induced Surface Area and Conductivity Modulation of Carbon Nanohorn and Its Function as an Efficient Metal-Free Oxygen Reduction Electrocatalyst for Anion-Exchange Membrane Fuel Cells", Small, 11(3): 352-360, Published Online Aug. 22, 2014.
Wang et al. "A High Conductivity Ultrathin Anion-Exchange Membrane With 500+ Alkali Stability for Use in Alkaline Membrane Fuel Cells That Can Achieve 2 W cm-2 at 80° C.", Journal of Materials Chemistry A, 6(31): 15404-15412, Published Online Jul. 16, 2018.
Wang et al. "Poly(Aryl Piperidinium) Membranes and Ionomers for Hydroxide Exchange Membrane Fuel Cells", Nature Energy, 4(5): 392-398, Apr. 8, 2019.
Wang et al. "Radiation-Grafted Anion-Exchange Membranes: The Switch From Low- to High-Density Polyethylene Leads to Remarkabe Enhanced Fuel Cell Performance", Energy & Environmental Science, 12(5): 1575-1579, Published Online Apr. 26, 2019.
Wu et al. "Novel Crosslinked Aliphatic Anion Exchange Membranes With Pendant Pentafluorophenyl Groups", Electrochimica Acta, 321: 134634-1-134634-9, Available Online Aug. 6, 2019.
Yang et al. "Preparation and Properties of Anion Exchange Membranes With Exceptional Alkaline Stable Polymer Backbone and Cation Groups", Journal of Membrane Science, 596: 117720-1-117720-8, Published Online Dec. 4, 2019.
Yassin et al. "Quantifying the Critical Effect of Water Diffusivity in Anion Exchange Membranes for Fuel Cell Applications", Journal of membrane Science, 608: 118206-1-118206-6, Published Online May 6, 2020.
Supplementary European Search Report and the European Search Opinion Dated Mar. 3, 2025 From the European Patent Office Re. Application No. 21828984.1. (7 Pages).
Peng "Electrode Development and Electrocatalysts Design for Polymer Electrolyte Membrane Fuel Cells", University of South Carolina ProQuest Dissertations & Theses, pp. 1-183, XP093252232, Dec. 31, 2019.

* cited by examiner

| | 60 °C | 80 °C | 110 °C |
|---|---|---|---|
| OCV | 1.06 V | 1.03 V | 1.02 V |

| | 60 °C | 80 °C | 110 °C |
|---|---|---|---|
| 0.95 V | 0.06 | 0.04 | 0.04 |
| 0.90 V | 0.10 | 0.12 | 0.10 |
| 0.85 V | 0.18 | 0.22 | 0.28 |
| 0.80 V | 0.33 | 0.42 | 0.58 |

| | 60 °C | 80 °C | 110 °C |
|---|---|---|---|
| 0.75 V | 0.55 | 0.75 | 1.00 |
| 0.65 V | 1.15 | 1.55 | 2.25 |
| 0.55 V | 2.00 | 2.55 | 3.82 |

| | 60 °C | 80 °C | 110 °C |
|---|---|---|---|
| 0.40 V | 3.15 | 3.40 | 4.70 |
| 0.30 V | 3.60 | 3.80 | 5.10 |
| LCD | 4.00 | 4.20 | 6.10 |

HIGH-TEMPERATURE ANION-EXCHANGE MEMBRANE FUEL CELL

RELATED APPLICATION/S

This application is a National Phase of PCT Patent Application No. PCT/IL2021/050782 having International filing date of Jun. 25, 2021, which claims the benefit of priority under 35 USC § 119(e) of U.S. Provisional Patent Application No. 63/044,374 filed on Jun. 26, 2020. The contents of the above applications are all incorporated by reference as if fully set forth herein in their entirety.

FIELD AND BACKGROUND OF THE INVENTION

The present invention, in some embodiments thereof, relates to energy conversion and, more particularly, but not exclusively, to an anion-exchange membrane fuel cell that is operable at high temperatures and methods utilizing same.

High-temperature proton-exchange membrane fuel cells (HT-PEMFCs) operating above 100° C. have been a significant topic of research over the past two decades. The main reason for the interest in operating PEMFCs at higher temperatures is to simplify the water management system [Rosli et al., *Int. J. Hydrogen Energy* 42 (2017) 9293-9314; Sun et al., *Membranes* (*Basel*) 9 (2019) 83]. Additional benefits include (i) increased electrochemical reaction kinetics resulting in reduced overpotentials, (ii) reduction of the sensitivity of platinum catalyst to fuel impurities, (iii) better ability to cool the cells due to the increased temperature differential between the high operating temperature and ambient temperature, (iv) improved capability to utilize the waste heat, and (v) the likelihood to integrate more copious, cost-effective platinum group metal (PGM)-free electrocatalysts into the cell. Sun et al. [2019, supra] reported on proton-conducting membranes used for high-temperature systems. These include Nafion®-based membranes and acid-doped polybenzimidazole-based membranes [Bai et al., *J. Power Sources* 443 (2019) 227219], which show high proton conductivity and in situ PEMFC power density values at temperatures higher than 100° C.

Attention to anion-exchange membrane fuel cells (AEMFCs) has significantly increased in recent years [Dekel, *J. Power Sources* 375 (2018) 158-169]. This technology offers several advantages, including, for example, the potential use of a variety of electrocatalysts and a wider range of low-cost polymers for use as membranes.

In the past few years, developments in anion exchange membranes (AEMs) have led to a significant increase in hydroxide conductivities, ultimately yielding improvements in the performance of anion exchange membrane fuel cells (AEMFCs) at low operating temperatures.

However, the performance of AEMFCs is limited by a usually low operating temperature, and most of the published performance and stability results were done at cell temperatures lower than 60° C. To date, there are very few publications of AEMFCs operated at 80° C., including, for example, Lee et al. [*Energy Environ. Sci.* 10 (2017) 275-285], which describes durable poly(arylene ether sulfone) anion exchange membrane with end-group cross-linking; Peng et al. [*J. Power Sources.* 390 (2018) 165-167]; Yang et al. [*J. Memb. Sci.* 596 (2020) 117720]; Wang et al. [*J. Mater. Chem. A* 6 (2018) 15404-15412]; Huang et al. [*J. Electrochem. Soc.* 166 (2019) F637-F644], which describes composite poly(norbornene) anion conducting membranes; Kim et al. [*J. Am. Chem. Soc.* 141 (2019) 18152-18159]; Park et al. [*J. Mater. Chem. A* 7 (2019) 25040-25046]; Wang et al. [*Energy Environ. Sci.* 12 (2019) 1575-1579], which teaches that a switch from low-density to high-density polyethylene leads to remarkably enhanced fuel cell performance; Wu et al. [*Electrochim. Acta.* 321 (2019) 134634], which describe crosslinked aliphatic anion exchange membranes with pendant pentafluorophenyl groups; Lu et al. [*Memb. Sci.* 598 (2020) 117797], which describe poly(meta-terphenyl piperidinium) with highly conductive side chain.

Wang et al. [*Nat. Energy* 4 (2019) 392-398] described an AEMFC operated at 95° C.

The majority of research reports involved catalysts containing critical raw materials (CRMs), such as platinum, palladium, and cobalt [Santillán-Saldivar et al., *Resour. Conserv*. Recycl. 164 (2021) 105108] with limited reports of AEMFCs containing CRM-free cathodes [Lu et al., *J. Power Sources* 372 (2017) 82-90; Lilloja et al., *Appl. Catal. B Environ.* 272 (2020) 119012; Pham et al., *Adv. Mater. Interfaces* 5 (2018) 1-9; To et al., *Nano Res.* 10 (2017) 1163-1177; Kim et al., *ACS Catal.* 9 (2019) 3389-3398; Kim et al., *Sci. Rep.* 5 (2015) 11-14; Tong et al., *J. Power. Sources* 441 (2019) 227166; Lee et al., *Angew. Chemie—Int. Ed.* 54 (2015) 9230-9234; Pham et al., *Adv. Sustain. Syst.* 1 (2017) 1600038; Unni et al., *Small* 11 (2015) 352-362; Klingele et al., *Electrochem Commun.* 77 (2017) 71-75].

Additional background art includes Dekel et al. [*J. Power Sources* 375 (2018) 191-204]; Dekel et al. [*J. Power Sources,* 420 (2019) 118-123]; Douglin et al. [*J. Power Sources Adv.* 5 (2020) 100023]; Mandal et al. [*J. Electrochem. Soc.* 167 (2020) 054501]; and Yassin et al. [*J. Membrane Sci.* 608 (2020), 118206].

SUMMARY OF THE INVENTION

According to an aspect of some embodiments of the invention, there is provided a method of operating an anion exchange membrane fuel cell comprising an anion exchange membrane sandwiched between an anode compartment and a cathode compartment, wherein the cathode compartment comprises a cathode electrode which comprises a cathode catalyst for promoting reduction of an oxidant to thereby generate anions and the anode compartment comprises an anode electrode which comprises an anode catalyst for promoting oxidation of a fuel, the method comprising contacting the cathode compartment with the oxidant, contacting the anode compartment with the fuel, and adjusting the operating temperature of the anion exchange membrane fuel cell to at least 100° C.

According to an aspect of some embodiments of the invention, there is provided an anion exchange membrane electrode assembly comprising an anion exchange membrane sandwiched between an anode compartment and a cathode compartment, wherein the cathode compartment comprises a cathode electrode which comprises a cathode catalyst for promoting reduction of an oxidant to thereby generate anions and the anode compartment comprises an anode electrode and an anode catalyst for promoting an electrochemical reaction.

According to an aspect of some embodiments of the invention, there is provided an electrochemical cell comprising the anion exchange membrane electrode assembly according to any of the respective embodiments described herein.

According to an aspect of some embodiments of the invention, there is provided a fuel cell comprising an anion exchange membrane sandwiched between an anode compartment and a cathode compartment, wherein the cathode compartment comprises a cathode catalyst for promoting reduction of an oxidant to thereby generate anions and the anode compartment comprises an anode catalyst for promoting oxidation of a fuel.

According to some of any of the embodiments described herein, the anion exchange membrane is a nanoporous or sub-nanoporous membrane.

According to some of any of the embodiments described herein, the anion exchange membrane is a porous membrane featuring closed porosity and capable of applying capillary forces that liquidify at least a portion of the water therewithin.

According to some of any of the embodiments described herein, the anion exchange membrane comprises a water-absorbent material and/or functional groups that feature high affinity to water.

According to some of any of the embodiments described herein, a thickness of the anion exchange membrane ranges from 10 to about 150 microns or from 50 to 150 microns.

According to some of any of the embodiments described herein, an ion exchange capacity of the membrane is lower than 1 mmol equivalent/gram, or lower than 0.8 mmol equivalent/gram, or lower than 0.7 mmol equivalent/gram.

According to some of any of the embodiments described herein, an ion exchange capacity of the membrane ranges from about 0.5 to about 0.8 mmol equivalent/gram.

According to some of any of the embodiments described herein, at least one, or both, of the anode catalyst and the cathode catalyst is a platinum group metal-free catalyst.

According to some of any of the embodiments described herein, the anode catalyst features an exchange current density lower than 0.05 mA/cm$^2$ at 25° C.

According to some of any of the embodiments described herein, the cathode catalyst features a kinetic current density lower than 0.50 mA/mg at 0.9 V and 25° C.

According to some of any of the embodiments described herein, at least one, or both, of the anode compartment and the cathode compartment further comprise an ionomer, wherein an amount of the ionomer is lower than 20% by weight of the total weight of the catalyst and/or a conductivity of the ionomer is lower than 50 mS/cm.

According to some of any of the embodiments described herein, at least one, or both, of the anode compartment and the cathode compartment is devoid of an ionomer.

According to some of any of the embodiments described herein, a thickness of the anode electrode and/or the cathode electrode is at least 50 microns, or at least 100 microns.

According to some of any of the embodiments described herein relating to an electrochemical cell, the electrochemical cell is a metal air battery.

According to some of any of the embodiments described herein relating to an electrochemical cell, the electrochemical cell is for oxygen purification or oxygen enrichment.

According to some of any of the embodiments described herein relating to an electrochemical cell, the electrochemical cell is operable at an operating temperature of at least 100° C.

According to some of any of the embodiments described herein relating to a fuel cell, the fuel cell is operable at an operating temperature of at least 100° C.

According to some of any of the embodiments relating to a fuel cell, the fuel cell is operated under conditions in which at least a portion of the water that is generated and/or consumed is in a liquid state at the temperature described herein.

According to some of any of the embodiments relating to a fuel cell, the fuel cell is capable of generating, when operated at the temperature described herein, an open circuit voltage higher than 0.8 V.

According to some of any of the embodiments relating to a fuel cell, the fuel cell is capable of generating, when operated at the temperature described herein, an open circuit voltage higher than 1.0 V.

According to some of any of the embodiments relating to a fuel cell, the fuel cell is capable of generating, when operated at the temperature described herein, a current density higher than 500 mA/cm$^2$ at 0.65 V.

According to some of any of the embodiments relating to a fuel cell, the fuel cell is capable of generating, when operated at the temperature described herein, a current density higher than 500 mA/cm$^2$ at 0.8 V.

According to some of any of the embodiments relating to a fuel cell, the fuel cell is capable of generating, when operated at the temperature described herein, a peak power density higher than 1.0 W/cm$^2$.

According to some of any of the embodiments relating to a fuel cell, the fuel cell is capable of generating, when operated at the temperature described herein, a peak power density higher than 2.0 W/cm$^2$.

According to some of any of the embodiments relating to a fuel cell, a limiting current density of the anion exchange membrane fuel cell is higher than 2.5 A/cm$^2$.

According to some of any of the embodiments relating to a fuel cell, a limiting current density of the anion exchange membrane fuel cell is higher than 5 A/cm$^2$ or higher than 6 A/cm$^2$.

According to some of any of the embodiments relating to an operating temperature of at least 100° C., an anion conductivity of the anion exchange membrane at the temperature described herein is at least 150 mS/cm.

According to some of any of the embodiments relating to an operating temperature of at least 100° C., an anion conductivity of the anion exchange membrane at the temperature described herein is at least 200 mS/cm.

According to some of any of the embodiments relating to an operating temperature of at least 100° C., at least one, or both, of the anode compartment and the cathode compartment further comprise an ionomer and the ionomer is stable at the temperature described herein, wherein an amount of the ionomer is lower than 20% by weight of the total weight of the catalyst and/or a conductivity of the ionomer is lower than 50 mS/cm.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Figure 1B:
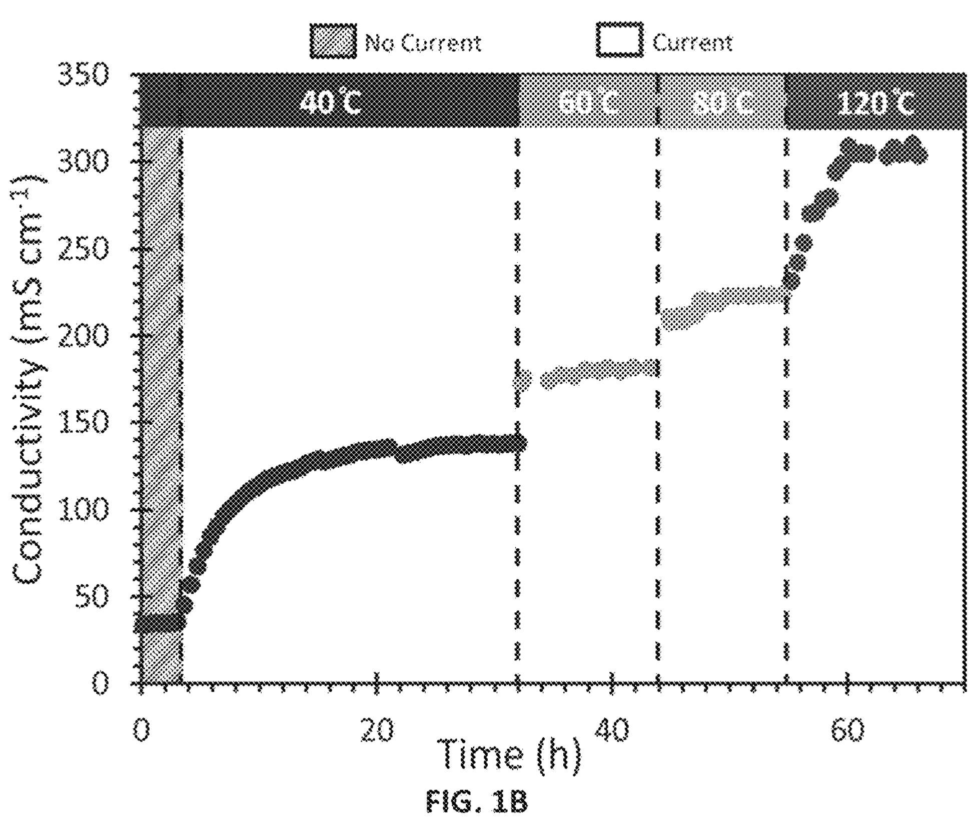

In the drawings:

FIGS. 1A and 1B present "true" hydroxide conductivity (4-probe) of an LDPE-BTMA anion-exchange membrane (AEM), measured at 40 and 110° C. (FIG. 1A) and at 40, 60, 80 and 120° C. (FIG. 1B); 0.1 mA direct current, under nitrogen flow at 95% relative humidity.

FIGS. 2A-2F present AEMFC polarization curves (FIGS. 2A and 2B) showing power density (upper plots, hollow shapes), cell voltage (filled shapes), and area-specific resistance (ASR; lower plots) as a function of current density; as well as comparative tables presenting the measured open circuit values (FIG. 2C), the extracted current density (A $cm^{-2}$) values at critical voltage in the kinetic regions (FIG. 2D), the extracted current density (A $cm^{-2}$) values at critical voltage in the Ohmic regions (FIG. 2E), and the extracted current density (A $cm^{-2}$) values at critical voltage in the Mass Transport regions (FIG. 2F) at each of the tested temperatures. The cell was operated at 110° C. (FIG. 2A) or at 60, 80 and 110° C. (FIGS. 2B-2F) under $H_2/O_2$ flows of 1 slpm (standard liter per minute) at 100% relative humidity and 1.5 barg back-pressurization on both anode and cathode (insert shows zoom-in of the dashed area, data collected at 5 mV/second).

Figure 2A:
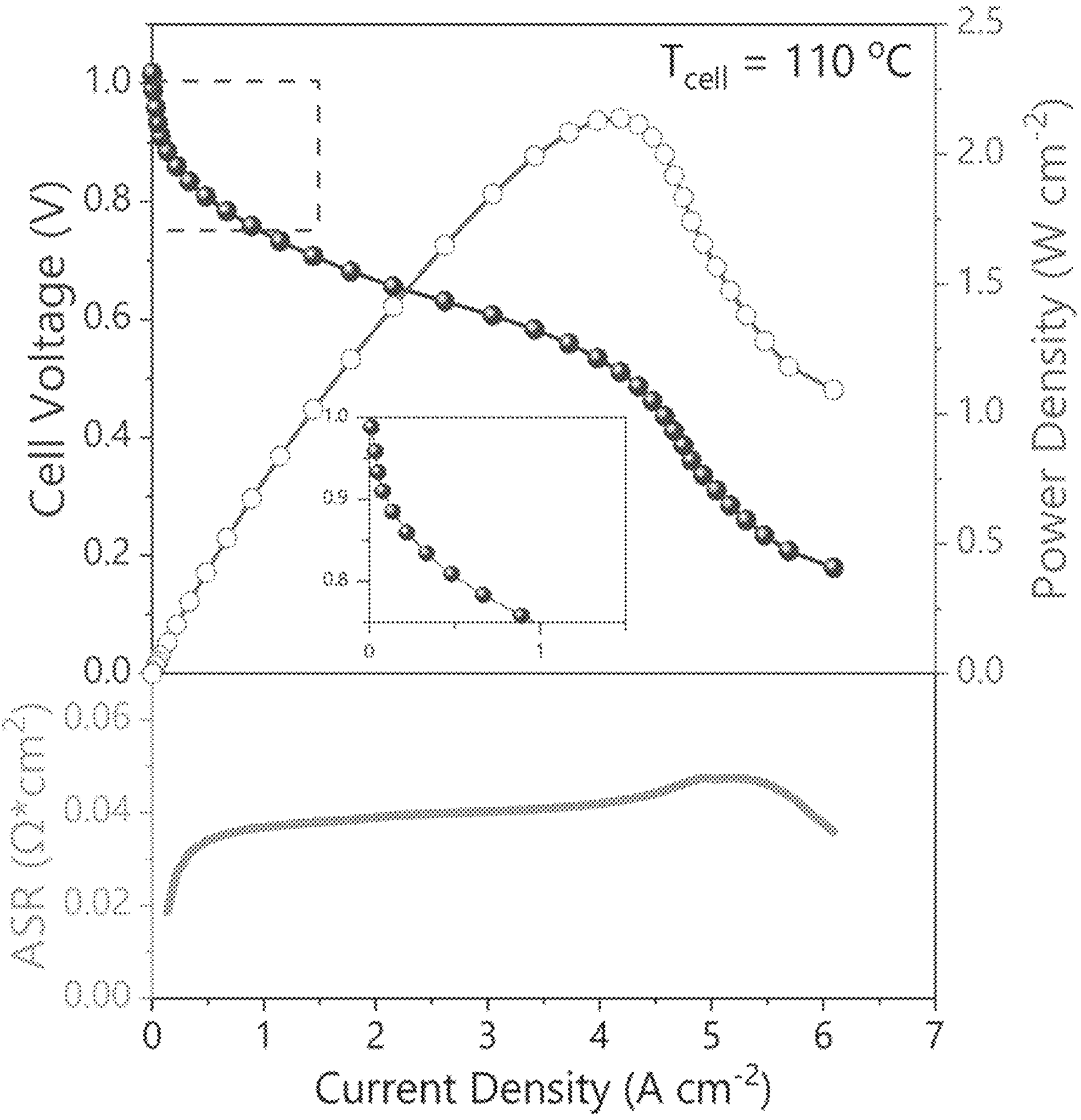
Figure 2B:
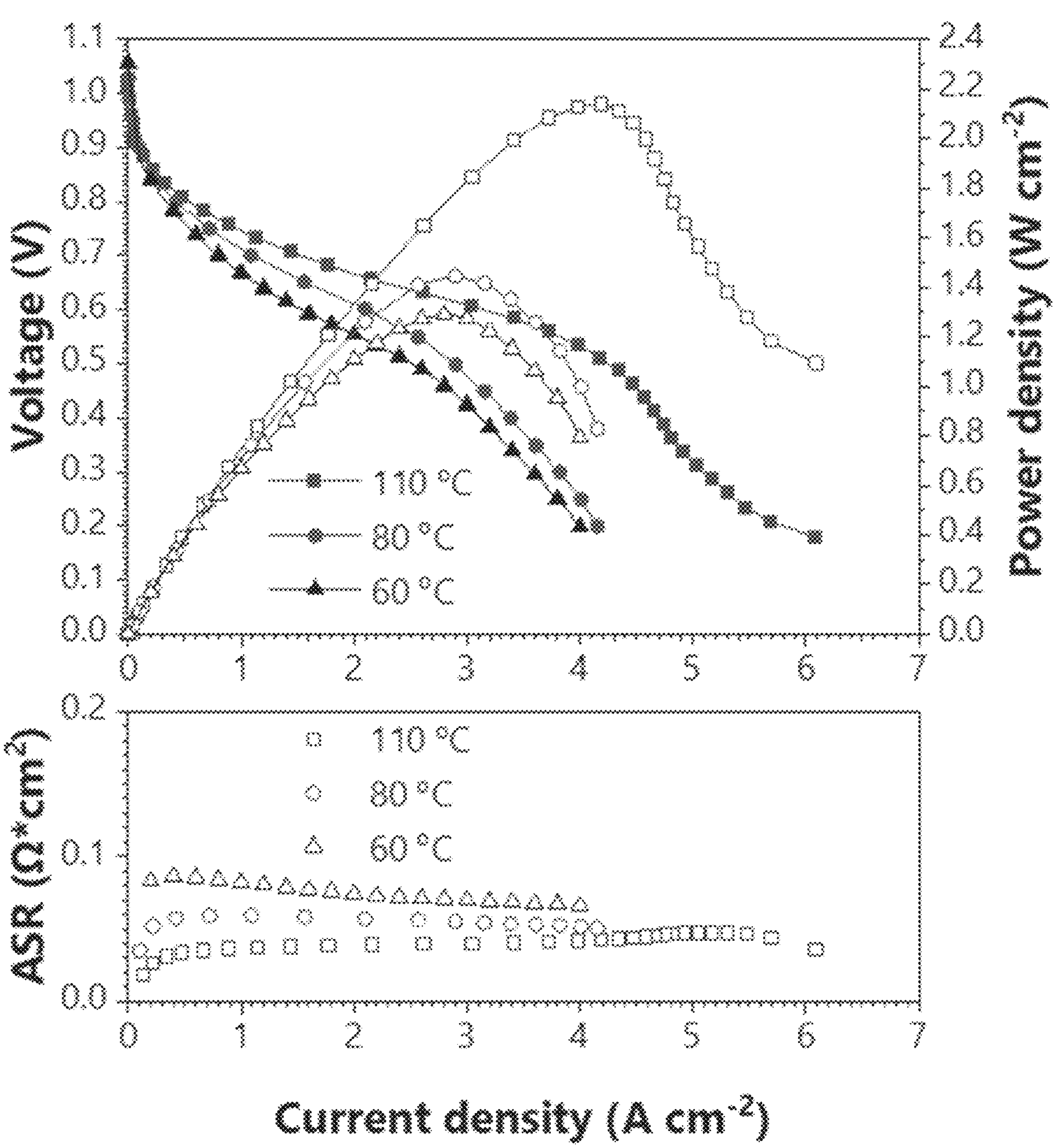
Figures 2C, 2D, 2E, 2F:
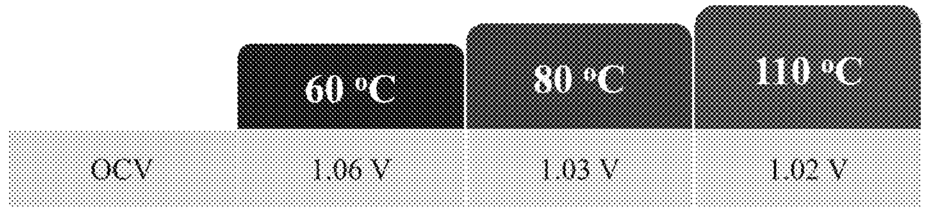
Figure 3:
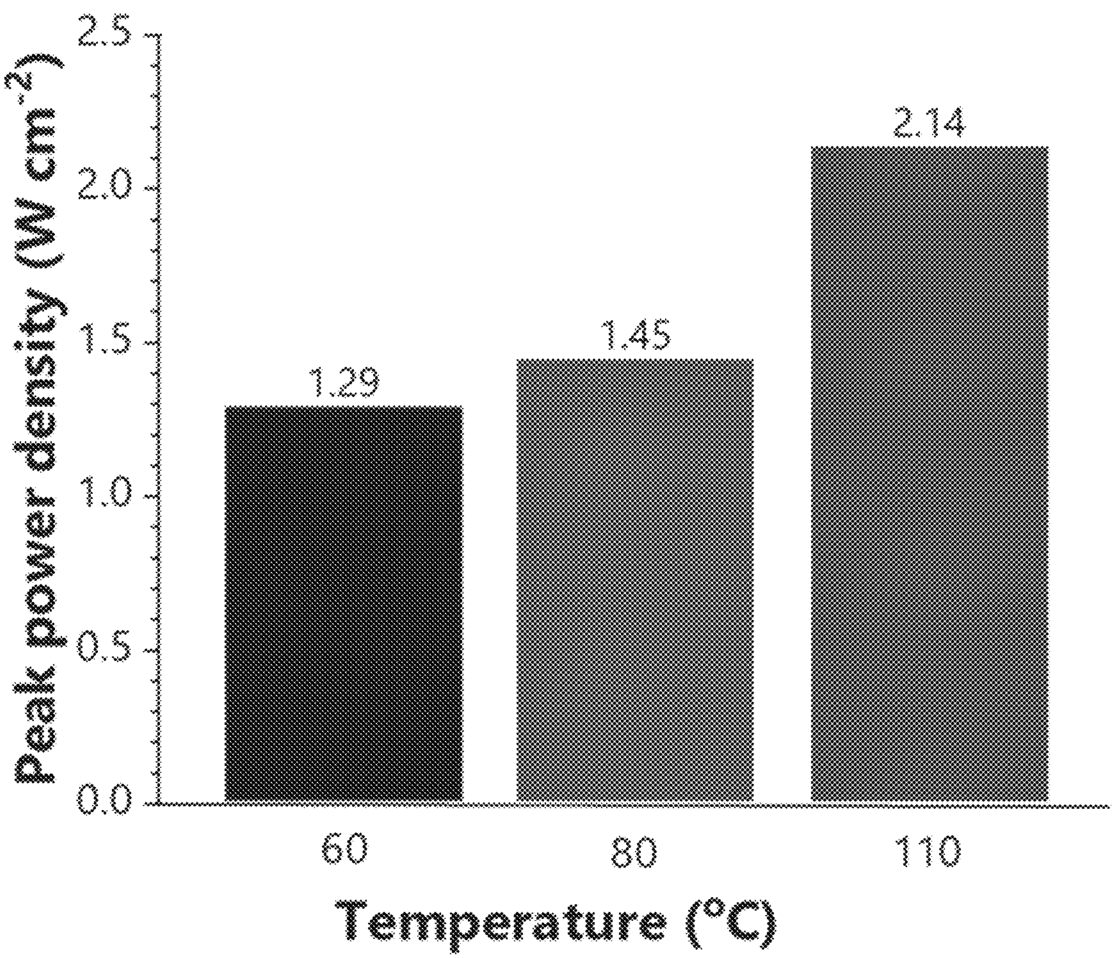

FIG. 3 is a bar graph presenting the peak power density of the AEMFC of FIGS. 2A-F, at each of the tested temperatures.

Figure 4:
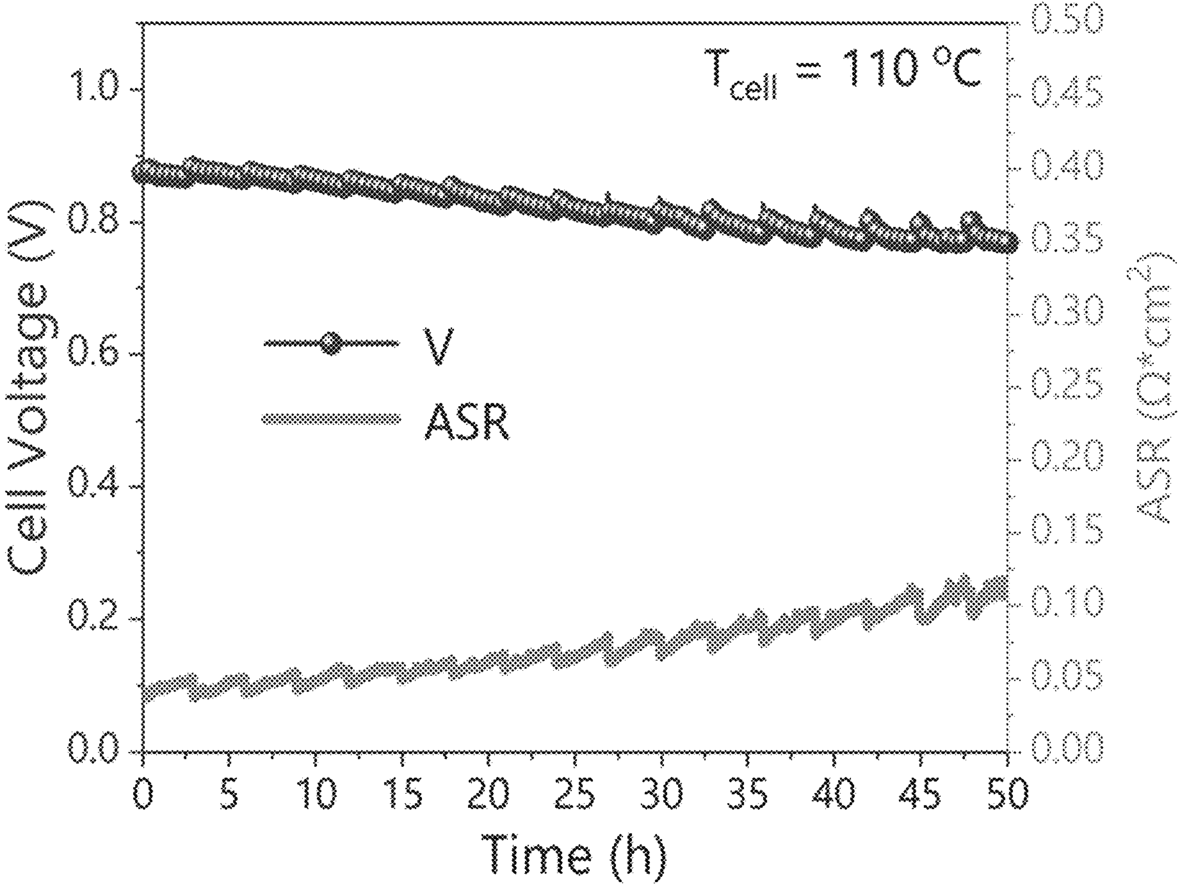

FIG. 4 presents the AEMFC in situ stability operation at 110° C. at a constant current density load of 0.2 A $cm^{-2}$, under $H_2/O_2$ flows of 1 slpm at 100% relative humidity and 1.5 barg back-pressurization on both anode and cathode. Cell voltage is presented by dark circles and ASR by continuous line.

Figure 5A:
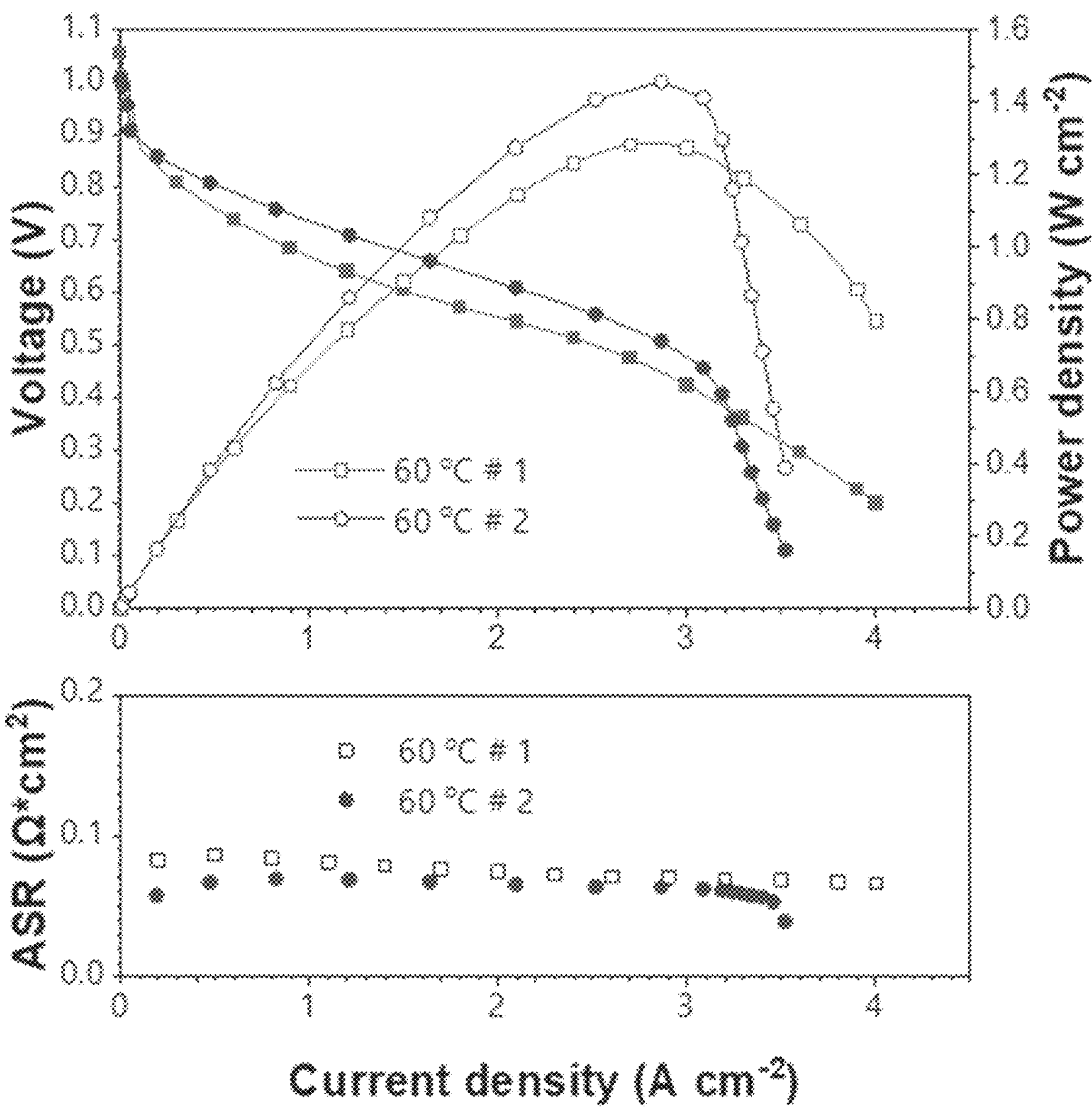
Figure 5B:
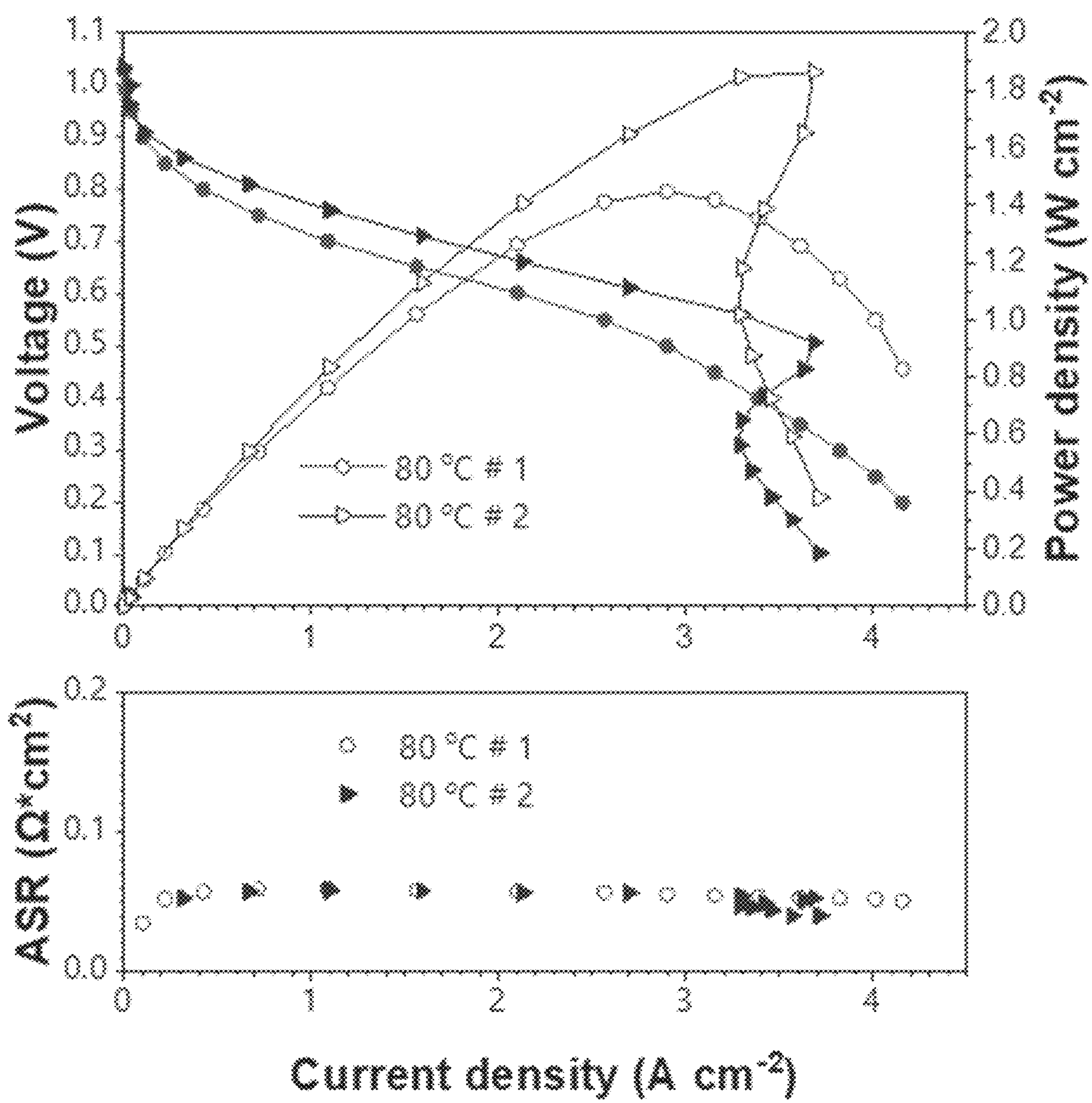
Figure 5C:
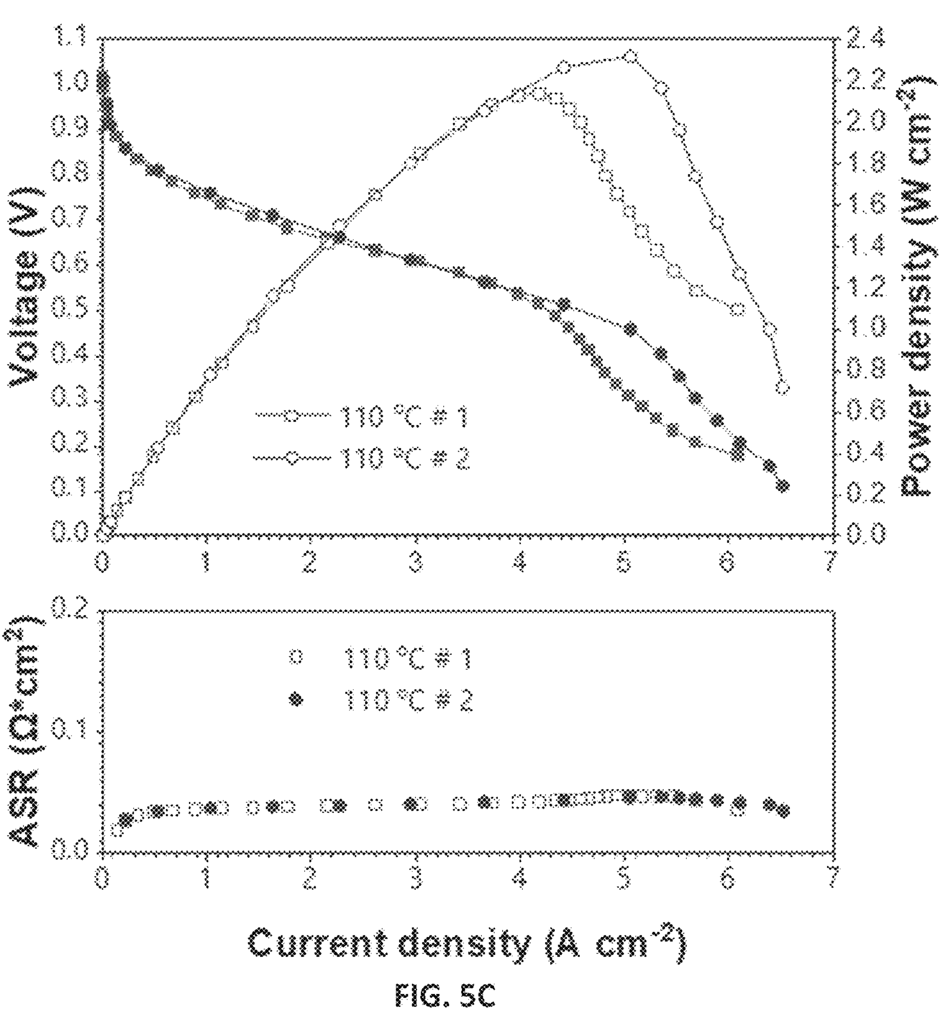
Figure 5D:
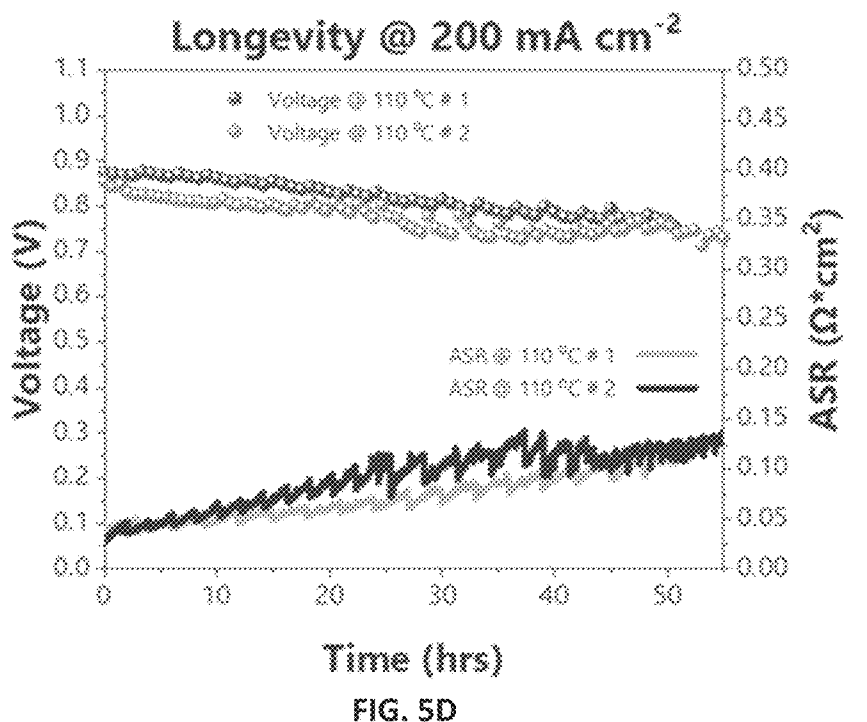

FIGS. 5A-5D present side-by-side performance comparisons of two AEMFC as described for FIGS. 2A-F, 3 and 4; polarization curves presenting power density (upper plots, hollow shapes), cell voltage (filled shapes), and area-specific resistance (ASR; lower plots) as a function of current density at 60° C. (FIG. 5A), 80° C. (FIG. 5B), 110° C. (FIG. 5C), and the long term performance stability (cell voltage and ASR as a function of time) at a constant current density of 200 mA cm-2 and 110° C. (FIG. 5D).

Figure 6A:
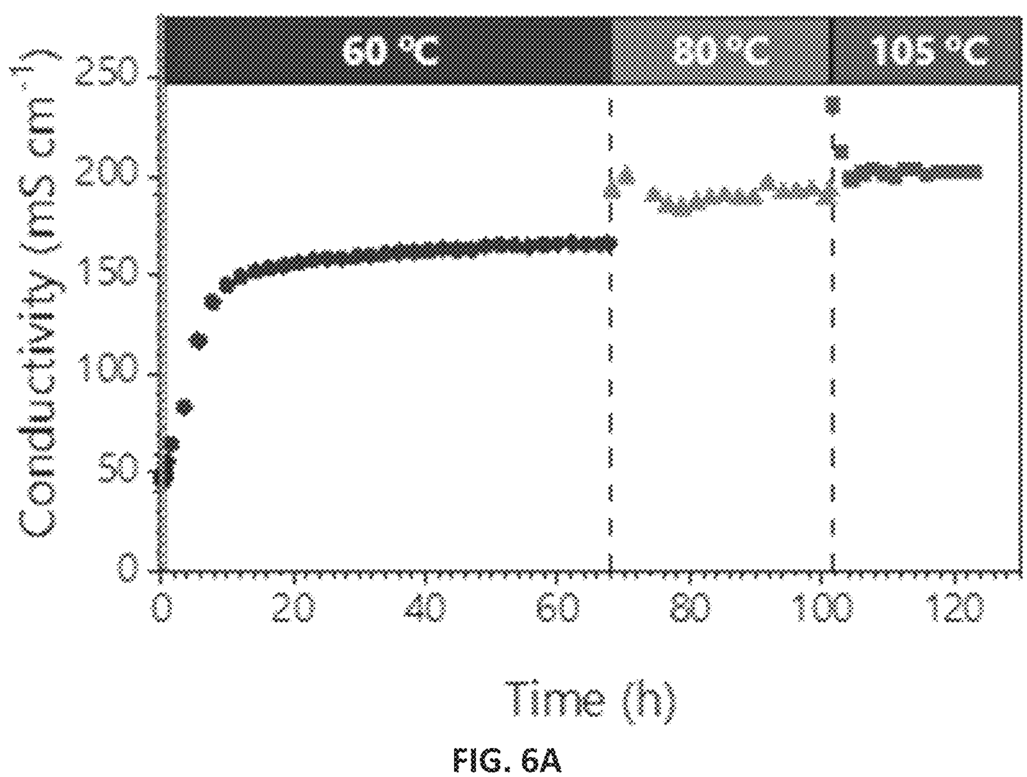
Figure 6B:
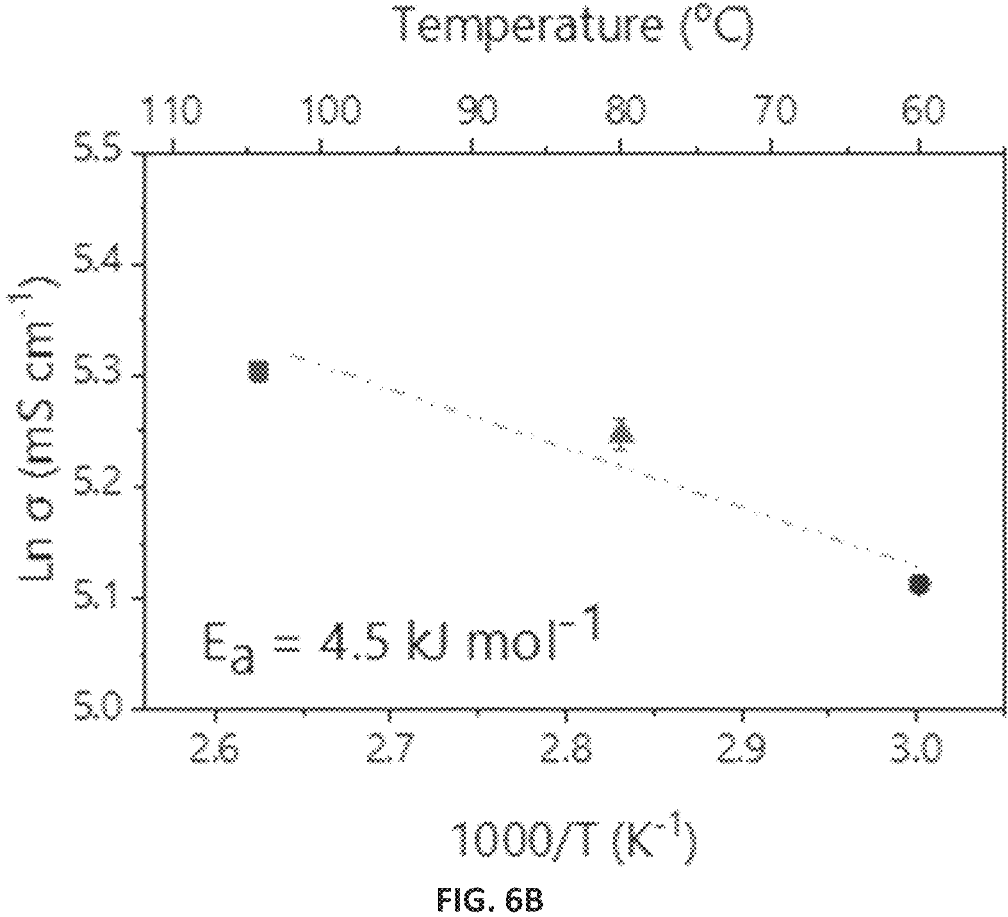

FIGS. 6A and 6B present a graph showing true $OH^-$ conductivity (4-probe) of an exemplary radiation-grafted ETFE-BTMA-based AEM as a function of time, upon exposure to temperatures of 60, 80, and 105° C. (FIG. 6A), and an Arrhenius plot (FIG. 6B) using data extracted from FIG. 6A; conditions were 0.1 mA direct current, $N_2$ flow of 500 $cm^3$/minute at 90% relative humidity.

Figure 7:
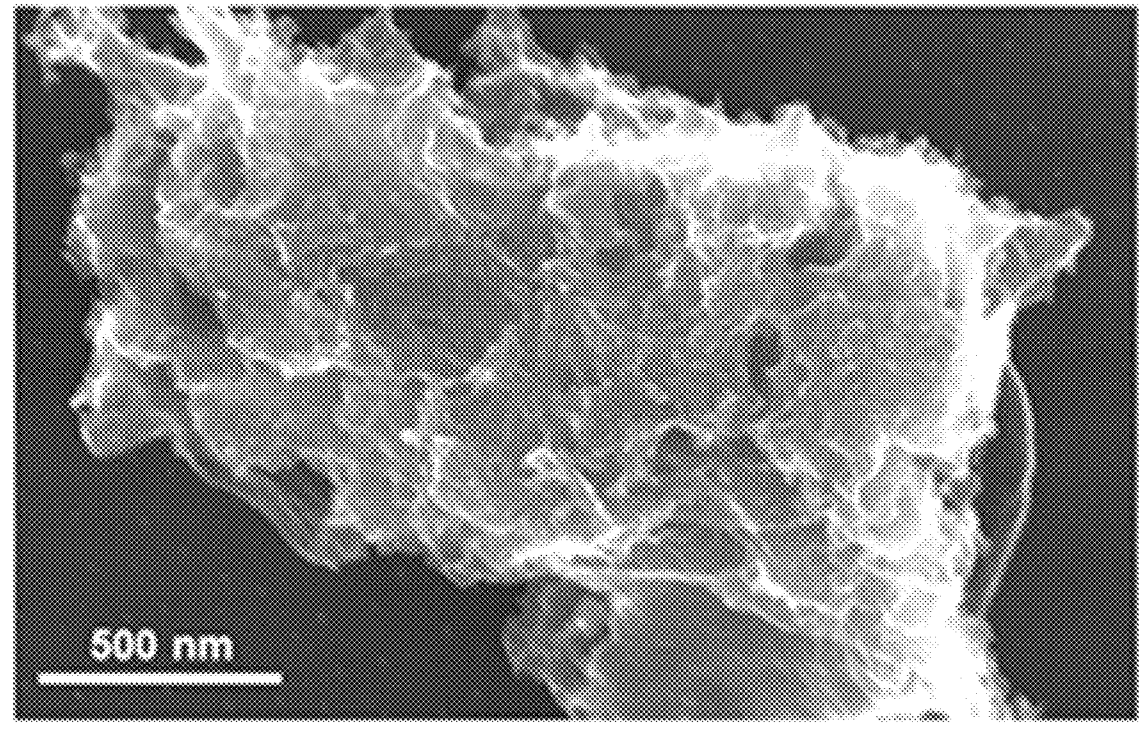

FIG. 7 presents a scanning electron microscopy image of an exemplary N-doped-C oxygen reduction reaction catalyst.

Figure 8A:
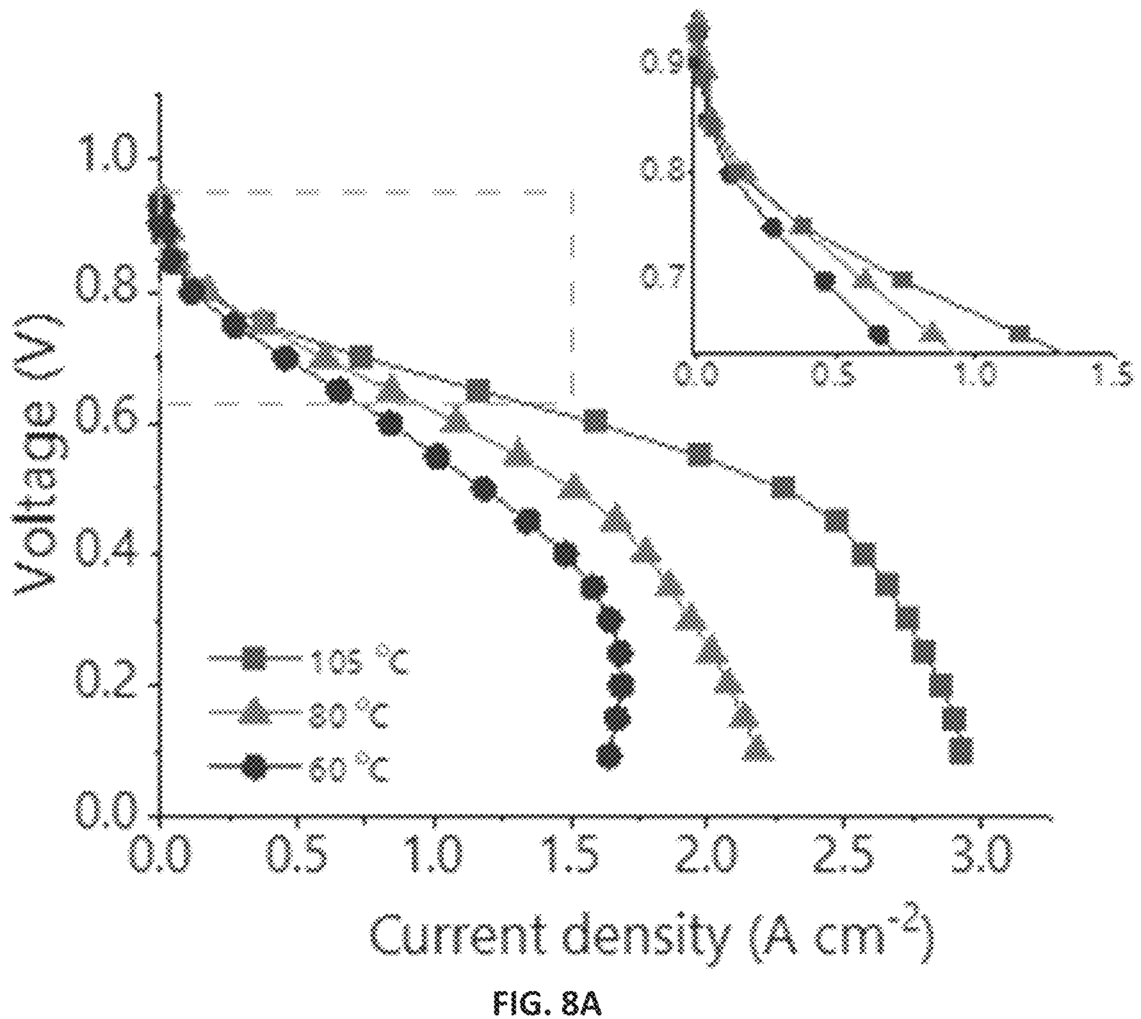
Figure 8B:
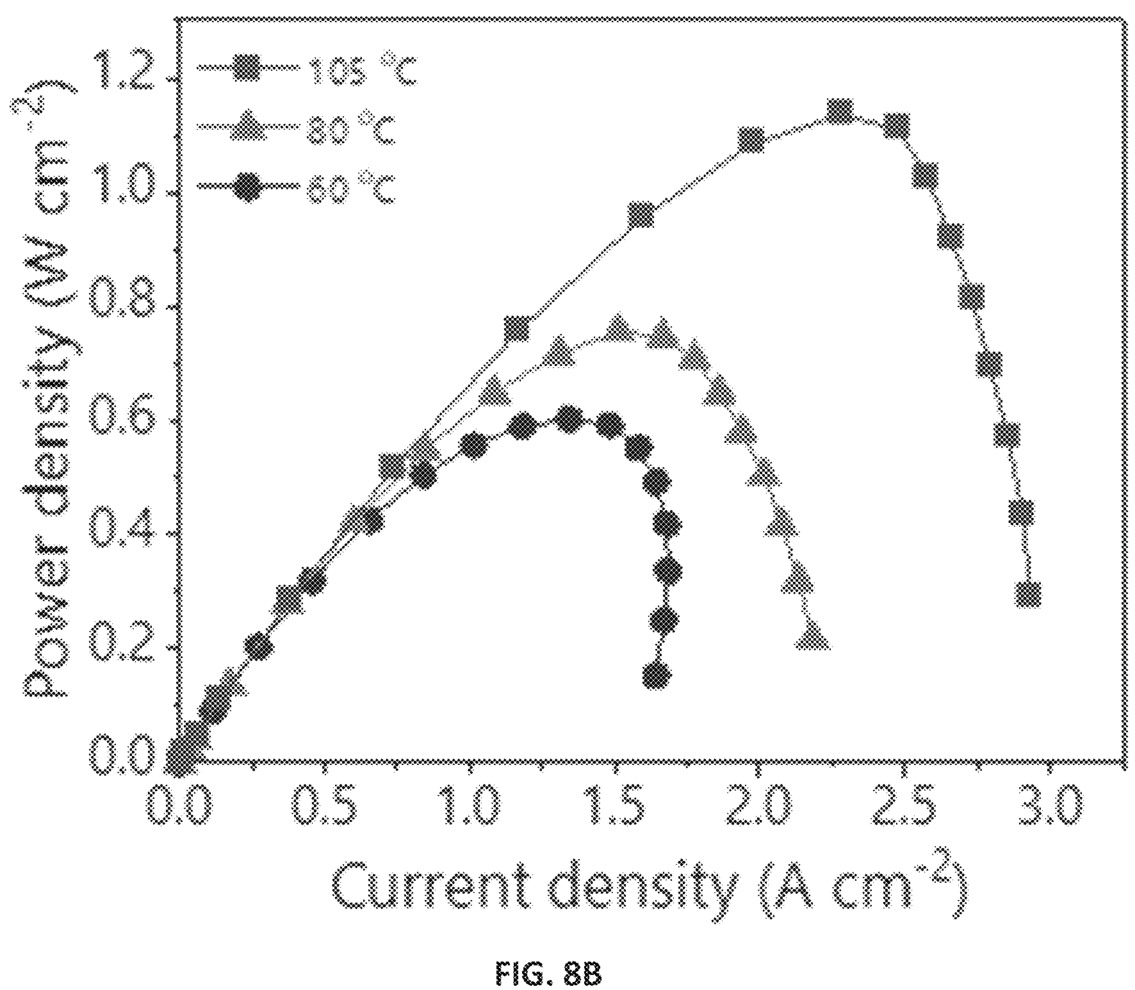
Figure 8C:
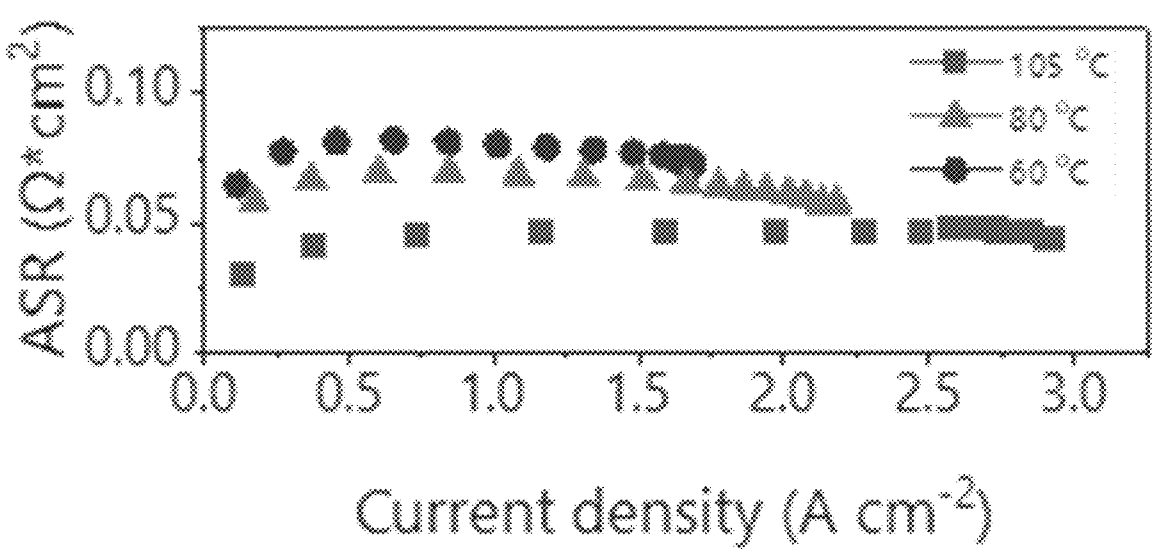

FIGS. 8A-8C present graphs showing voltage as a function of current density (FIG. 8A), power density as a function of current density (FIG. 8B), and ASR as a function of current density (FIG. 8C) for an exemplary AEMFC; data was collected at 5 mV/second, with $H_2/O_2$ gas flows of 1 L/minute under the following conditions: cell temperature of 105° C. with optimized dew points and 1.4 barg back-pressurization on both electrodes, cell temperature of 80° C. with optimized dew points and 1 barg back-pressurization on both electrodes, and cell temperature of 60° C. with optimized dew points and no back-pressurization.

Figure 9A:
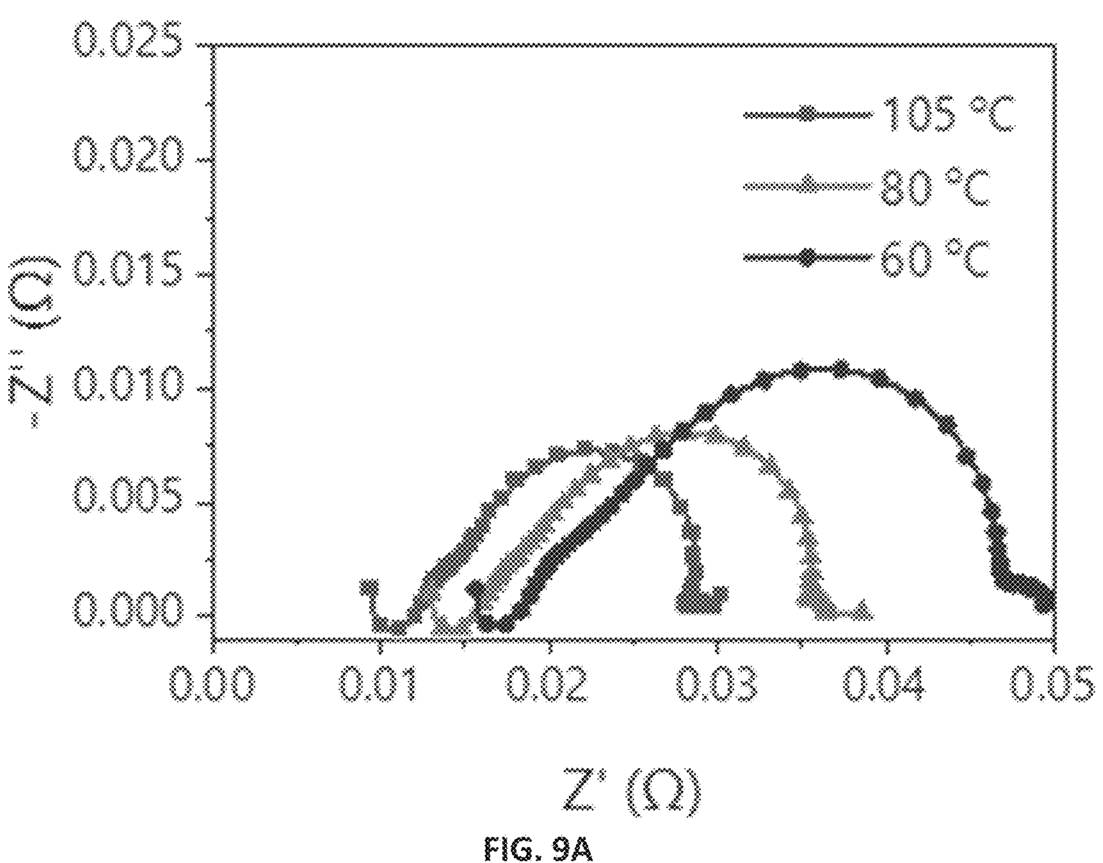
Figure 9B:
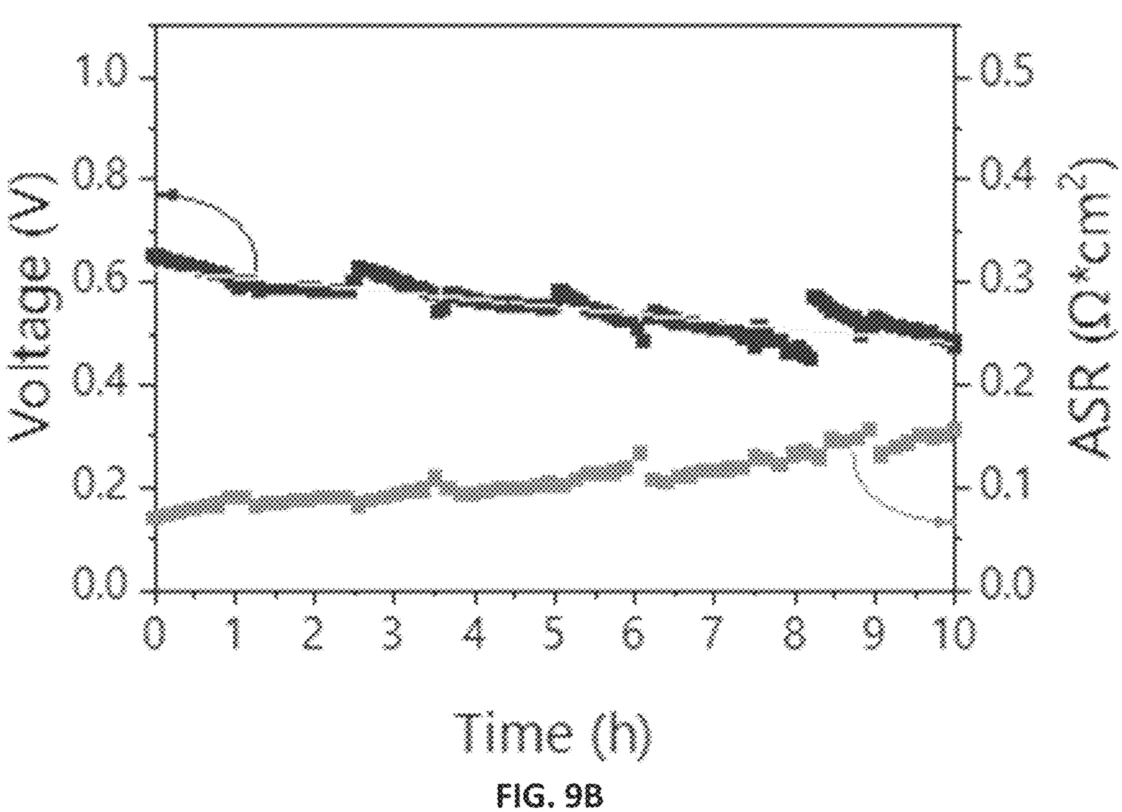
Figure 9C:
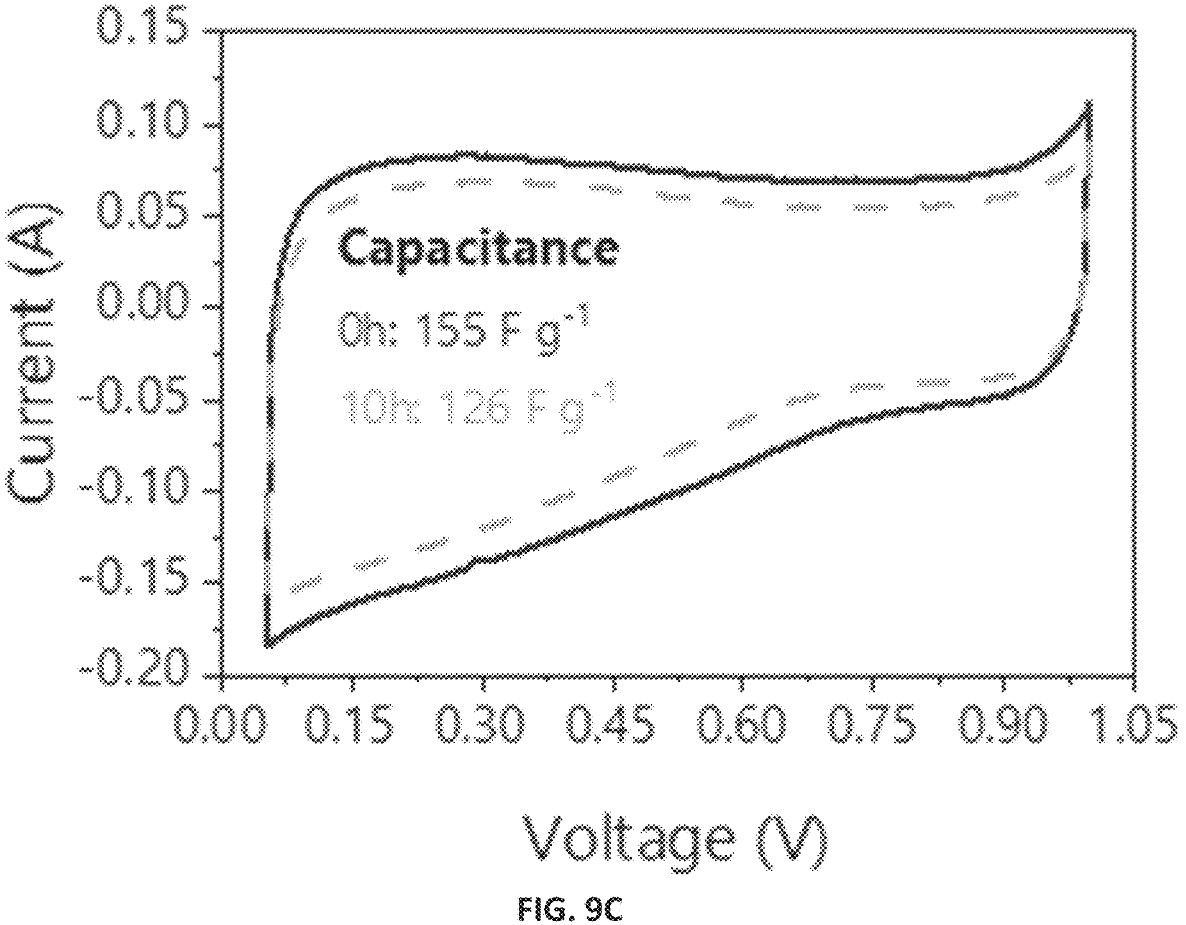

FIGS. 9A-9C present $H_2/O_2$ in situ EIS data (10,000 to 0.1 Hz, AC amplitude=5% of the current) obtained at 60° C., 80° C., and 105° C. (FIG. 9A), an initial 10 hour in operando durability test at a cell temperature of 105° C. with a constant current density discharge of 500 mA/$cm^2$ (FIG. 9B), and in situ $H_2/N_2$ CV data for the N-doped-C (100 mV/second) both before (0 h, solid line) and after (10 h, dashed line) the 10 hour stability test (FIG. 9C).

Figure 10:
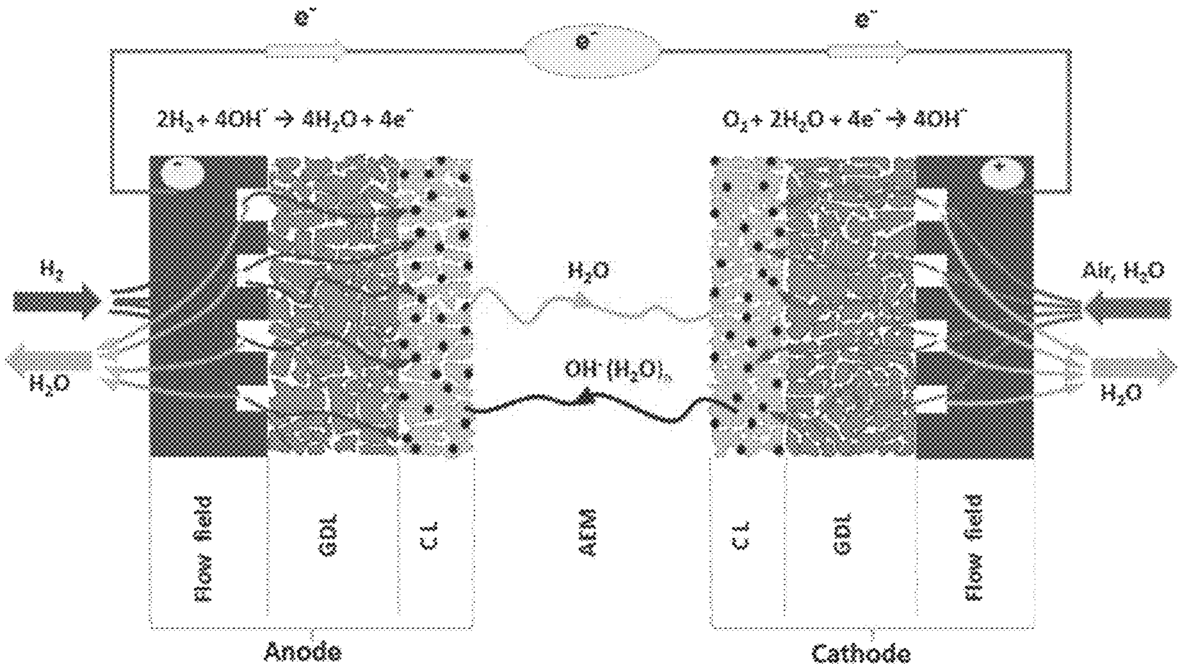

FIG. 10 (Background Art) presents a schematic illustration of an exemplary AEMFC and its mode of operation.

DESCRIPTION OF SPECIFIC EMBODIMENTS OF THE INVENTION

The present invention, in some embodiments thereof, relates to energy conversion and, more particularly, but not exclusively, to an anion-exchange membrane fuel cell that is operable at high temperatures and methods utilizing same.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present inventor has envisioned that anion exchange membrane fuel cells (AEMFCs) operating at temperatures above 100° C. may lead to significant advantages, and has uncovered anion exchange membranes (AEMs) and operating conditions suitable for such purposes.

AEMFCs that are operable at such high temperatures may offer many advantages, including, but not limited to: (i) increased membrane conductivity and increased electrochemical reaction kinetics resulting in reduced overpotential losses in the fuel cell, (ii) reduction of the sensitivity of the electrocatalyst to fuel impurities, (iii) a reduced cooling requirement due to the high operating temperature, (iv) improved capability to utilize the waste heat, (v) the likelihood to integrate more abundant, cost-effective platinum group metal-free electrocatalysts into the cell, and (vi) the ability of the fuel cell to efficiently work with non-conventional fuels, such as alcohols, ammonia, urea, hydrazine, among others.

While reducing the present invention to practice, the inventor has successfully practiced high-temperature anion-exchange membrane fuel cells (HT-AEMFC), which were shown to successfully and efficiently operate at a temperature range of from 100 to 200° C. As shown in FIGS. 1A and 1B, when tested at 110° C. and 120° C., an exemplary anion exchange membrane exhibits a true hydroxide conductivity close to 300 mS/cm, and, as shown in FIGS. 2A and 3, a non-optimized exemplary AEMFC delivered a peak power density of 2.1 $W/cm^2$ (measured at 0.51 V), reaching a limiting current of above 6 $A/cm^2$. The cell boasted an impressive current density as high as 574 $mA/cm^2$ measured at 0.8 V (FIGS. 2A, 2B and 2D), which supersedes currently known AEMFCs. The AEMFC retained 0.8 V performance after 50 hours of operation at a constant current density of 200 $mA/cm^2$, as shown in FIG. 4. Reproducibility of has also been demonstrated (FIGS. 5A-D). As shown in FIGS. 6A and 6B, another exemplary AEM exhibited at 105° C. a true $OH^-$ conductivity of 201 mS/cm.

The present inventor has further successfully practiced high-temperature AEMFCs with a highly active critical raw material (CRM)-free N-doped-C cathode. As shown in FIGS. 8A-8C, an exemplary high-temperature AEMFC containing the CRM-free cathode delivered a peak power density of 1.14 $W/cm^2$ and reached a limiting current density of 2.9 $A/cm^2$, with realization of a reduced cell resistance at 105° C. Furthermore, this exemplary platinum group metal-free cathode high-temperature AEMFC outperformed all recently reported high-temperature PEMFCs, which were tested at even higher temperatures. This work demonstrates the potential of operating AEMFCs with platinum group metal-free (and even CRM-free) cathodes at high temperatures. Additionally, the utilization of CRM-free catalysts can reduce manufacturing supply chain risks with such strategic renewable energy technologies.

The high-temperature AEMFC disclosed herein may provide for (i) increased membrane conductivity and overall increased efficiency of the fuel cell; (ii) increased electrochemical reaction kinetics resulting in reduced overpotential losses in the fuel cell, and overall increased efficiency of the fuel cell; (iii) reduction of the sensitivity of metal electrocatalyst to fuel impurities, which may reduce operating expenses; (iv) a reduced cooling requirement due to the high operating temperature, which may reduce operating expenses; (v) improved capability to utilize the waste heat, which increases the efficiency of the whole system; (v) increased capability to integrate (e.g., by increasing electrocatalytic activity) more copious, cost-effective platinum group metal (PGM)-free electrocatalysts into the cell, which reduces costs; and (vi) the ability of the fuel cell to efficiently work with non-conventional fuels, such as alcohols, ammonia, urea, hydrazine, among others.

Further potential advantages include, but not limited to, increased tolerance of the catalysts to carbon monoxide and carbon dioxide; and the ability to operate the anode at reduced humidification on account of the increased hydroxide conductivity in the membrane, giving way to increased water generation and back-diffusion. In addition, handling carbon dioxide/carbonation during operation under ambient air is facilitated due to the significantly reduced water solubility of $CO_2$ at high temperatures.

Embodiments of the present invention relate to a method of operating an anion exchange membrane electrode assembly (e.g., an electrochemical cell, optionally an anion exchange membrane fuel cell (AEMFC)) at high temperatures, e.g., at a temperature of 100° C. or higher, e.g., from 100 to 200° C. Embodiments of the present invention further relate to anion exchange membranes and anion exchange membrane electrode assemblies (e.g., electrochemical cells, optionally fuel cells) that are operable at such a high temperature, to systems comprising such electrode assemblies (e.g., fuel cell systems comprising such AEMFC), and to devices and systems that are operable by such fuel cells or fuel cell systems.

According to an aspect of some embodiments of the present invention there is provided an anion exchange membrane electrode assembly, which comprises an anode compartment, a cathode compartment, and an anion exchange membrane sandwiched therebetween. The cathode compartment comprises a cathode catalyst for promoting reduction of an oxidant to thereby generate anions (e.g., hydroxide ions), which move through the anion exchange membrane to the anode. The anode compartment comprises an anode catalyst for promoting oxidation of a substance (e.g., a fuel). An anion exchange membrane is typically a solid or semi-solid membrane and/or film, being in fluid communication with the anode and cathode compartments.

According to an aspect of some embodiments of the present invention there is provided a method of operating an anion exchange membrane electrode assembly (according to any of the respective embodiments described herein), the method comprising contacting the cathode compartment with an oxidant, contacting the anode compartment with an oxidizable substance (e.g., fuel), and adjusting the operating temperature of the anion exchange membrane electrode assembly to at least 100° C.

In some of any of the respective embodiments described herein (according to any of the respective aspects described herein), the anion exchange membrane electrode assembly is an electrochemical cell, which comprises an anode compartment, a cathode compartment, and an anion exchange membrane sandwiched therebetween (according to any of the respective embodiments described herein). Such an electrochemical cell is operable at a temperature of at least 100° C., according to any of the embodiments described herein relating to operating temperature.

Herein, the term "electrochemical cell" refers to a device capable of generating electrical energy from a chemical reaction and/or capable of using electrical energy to cause a chemical reaction.

Examples of electrochemical cells include, without limitation, a fuel cell, a battery, and an oxygen purifier or generator.

Herein, the term "fuel cell" refers to an electrochemical cell that generates electrical energy from oxidation of a fuel, optionally by oxygen (e.g., oxygen provided from outside the fuel cell).

Herein, the term "battery" refers to an electrochemical cell that generates electrical energy from a spontaneous redox reaction taking place within the cell (e.g., as opposed to requiring provision of a fuel from outside). A battery may optionally be rechargeable, that is, capable of using applied electrical energy to reverse the spontaneous redox reaction, thereby allowing the spontaneous redox reaction to take place again.

Embodiments of the anion exchange membrane electrode assembly are described herein most frequently in terms of a fuel cell (an exemplary embodiment). However, it is to be understood that other forms of anion exchange membrane electrode assembly are contemplated. Herein throughout, whenever reference is made to a fuel cell and/or electrochemical cell, it is to be understood that other AEM assemblies are also contemplated, unless otherwise indicated.

Reference is made to FIG. 10 (Background Art; taken from Dekel [*J. Power Sources* 375 (2018) 158-169]) which presents a schematic illustration of an exemplary anion exchange membrane fuel cell, which utilize hydrogen as a fuel, and which is usable in the context of the present embodiments. The fuel cell includes an anode compartment, which comprises a fuel electrode (anode), a cathode compartment, which typically comprises air or oxygen electrode (cathode), and an anion exchange membrane, which is typically a solid polymer electrolyte membrane that is capable of conducting anions such as $OH^-$, and that is sandwiched between the fuel electrode and the air electrode. In some embodiments, and as exemplified in FIG. 10, each of anode and cathode compartments comprise a respective catalyst layer, a gas diffusion layer (GDL) and flow field.

When the cell is operated, air or oxygen and water are supplied to the cathode compartment (e.g., via the respective flow field and through the respective GDL) to contact the cathode catalyst, and react with electrons to generate $OH^-$. The generated $OH^-$ moves through the AEM by an ion conduction to the anode compartment, where it reacts with the fuel (e.g., $H_2$), that is supplied to the anode compartment (e.g., via the respective flow field and through the respective GDL) to generate $H_2O$ and emit electrons. During the fuel cell operation, an electromotive force is generated between anode and cathode compartments, resulting in generation of electric power.

During the operation of an AEMFC, water is generated at the anode, and is a reactant at the cathode. Some of the water is dragged through the AEM and/or diffuses through the AEM.

Similarly, an electrochemical cell other than a fuel cell (according to any of the respective embodiments described herein) may optionally adopt a configuration as exemplified in FIG. 10, but operated using different reactants and/or different transport mechanism and/or can adopt a different configuration.

In some embodiments, the electrochemical cell is a battery, for example, whereupon discharge the cathode produces anions (e.g., hydroxide anions). Suitable cathodes and anodes for batteries are known in the art.

In some embodiments, the battery is a metal-air battery, in which the cathode electrode is an air electrode, that upon discharge produces anions and the anode is a metal anode that is oxidizable. The anode metal may comprise, for example, an alkali metal (e.g., Li, Na or K), zinc, magnesium, calcium, aluminum, iron and/or silicon.

The battery (according to any of the respective embodiments described herein) is optionally operated at a temperature of at least 100° C. (according to any of the embodiments described herein relating to operating temperature). Operating the battery includes charging or discharging the battery.

In some embodiments, the electrochemical cell is for use in purification or enrichment of oxygen, in which air or oxygen is supplied to the cathode compartment, reduced to produce hydroxide anions, which are transported through the AEM to the anode compartment where hydroxide ions are oxidized and pure oxygen is reproduced.

According to an aspect of some embodiments of the present invention there is provided a method of oxygen purification or enrichment, by operating an electrochemical cell according to any of the respective embodiments described herein, by contacting said cathode compartment with air or oxygen, and adjusting the operating temperature of the electrochemical cell to a temperature of at least 100° C. (according to any of the embodiments described herein relating to operating temperature). Upon operation of the electrochemical cell, the cathode catalyst promotes reduction of air or oxygen to thereby generate hydroxide anions and the anode catalyst promotes oxidation of said hydroxide anions.

Operating Conditions:

As discussed hereinabove, the operating conditions of a fuel cell or electrochemical cell according to any of the respective embodiments described herein are optionally adjusted to comprise a high temperatures, e.g., a temperature of 100° C. or higher, e.g., from 100 to 200° C. In some embodiments, the temperature is in a range of from 100° C. to 150° C., e.g., from 100° C. to 120° C., or from 115° C. to 135° C., or from 130° C. to 150° C. In some embodiments, the temperature is in a range of from 150° C. to 200° C., e.g., from 150° C. to 170° C., or from 165° C. to 185° C., or from 180° C. to 200° C.

According to some of any of the embodiments described herein, the fuel cell (or electrochemical cell) is operated under conditions in which at least a portion of the water that is generated (e.g., at the anode compartment) and/or consumed (e.g., in the cathode compartment) and/or present within or passes through the AEM is in a liquid or quasi-liquid state at the operating temperature.

Herein, the term "quasi-liquid" refers to a substance in a state wherein the substance hast an ability to flow in response to pressure.

By "at least a portion" it is meant at least 20%, or at least 30%, or at least 40%, or at least 50%, or at least 60%, or at least 70%, or at least 80%, or at least 90%, or about 100%.

According to some embodiments, the portion of the water that is in a liquid or quasi-liquid state is a portion that is required to solvate the hydroxide ions that are transported through the AEM when the cell is operated. In some embodiments, the portion of the water that is in a liquid quasi-liquid state corresponds to a hydration number (molar ratio of water to hydroxide anions) of about 1.

Conditions that may be controlled so as to have at least a portion of the water in a liquid or quasi-liquid state include, but are not limited to, the pressure in the fuel cell (or electrochemical cell), the relative humidity and/or dew points, and/or the inlet temperatures (e.g., to the flow fields).

Manipulating or controlling or adjusting these parameters so as to achieve a good performance of the AEMFC at the operating temperature, for example, the required hydration rate or the required portion of water in a liquid or quasi-liquid state, can be done according to models that simulate the cell performance at various relative humidities, temperatures and/or pressures, and the interrelations therebetween. Exemplary such models are described, for example, in Dekel et al. [*J. Power Sources* 375 (2018) 191-204]; Dekel et al. [*J. Power Sources,* 420 (2019) 118-123]; and Yassin et al. [*J. Membrane Sci.* 608 (2020) 118206], the teachings of each of which are incorporated herein by reference (especially teachings regarding operating conditions of an AEMFC).

Humidity may optionally be controlled by humidifying a gas (e.g., air or oxygen) entering the cell, e.g., by contact with liquid water, in order to increase humidity; and/or by dehumidifying a (e.g., air or oxygen) entering the cell, e.g., by contact with a water-absorbing substance and/or with a cold surface which promotes condensation of water vapor. Many suitable humidifiers and dehumidifiers are known in the art. Alternatively or additionally, humidity may be controlled by controlling a rate of exit of water vapor generated in the cell (e.g., at the cathode) from the cell. Under given conditions (e.g., at a given temperature), the relative humidity and dew point are both determined by the absolute humidity—thus, relative humidity and dew point are not independent parameters, but merely two ways of quantifying humidity.

Temperature may optionally be controlled by passing a gas (e.g., air or oxygen) entering the cell over a heated or cooled surface, and/or by contacting a portion of a cell (e.g., a heat-conducting portion, such as a metallic barrier) with a heated or cooled fluid and/or solid surface. Many suitable temperature control devices are known in the art. It is to be appreciated that an elevated temperature described herein may optionally be obtained by heat generated by the cell (e.g., by initially operating the cell at a lower temperature), for example, by controlling a degree (if any) to which the cell is cooled.

Pressure may optionally be increased by increasing a rate of entry of a gas (e.g., air or oxygen) entering the cell and/or reducing a rate of exit of a gas (e.g., unreacted air or oxygen, and/or water vapor or carbon dioxide generated in the cell) from the cell.

According to some embodiments, when operated (e.g., at a temperature according to any of the respective embodiments described herein), a pressure within at least a part of the fuel cell (or electrochemical cell) is higher than atmospheric pressure, for example, higher than 1 bar, e.g., at least 1.5 bar, 2 bar, 2.5 bar, etc. (absolute bar).

Pressure within at least a part of the fuel cell (or electrochemical cell) may optionally be determined using any suitable technique or device known in the art for determining pressure (e.g., a manometer). Absolute pressure in the region of interest may optionally be determined. Alternatively, a gauge pressure (i.e., difference between pressure in region of interest and ambient pressure) may be determined, and the ambient pressure may be determined by measurement of absolute pressure or by estimation (e.g., based on relationships between pressure and temperature and elevation known in the art).

According to some embodiments, when operated (e.g., at a temperature according to any of the respective embodiments described herein), a relative humidity within at least a part of the fuel cell (or electrochemical cell) is at least 90%. In some such embodiments, a pressure within at least a part of the fuel cell (or electrochemical cell) is at higher than 1 bar, for example, at least 1.5 bar, at least 2 bar, or at least 2.5 bar.

Relative humidity within at least a part of the fuel cell may optionally be determined using any suitable technique or device known in the art for determining relative humidity, e.g., a hygrometer.

According to some embodiments, when operated (e.g., at a temperature according to any of the respective embodiments described herein), a relative humidity within at least a part of the fuel cell (or electrochemical cell) is at least 95%. In some such embodiments, a pressure within at least a part of the fuel cell (or electrochemical cell) is at higher than 1 bar, for example, at least 1.5 bar, at least 2 bar, or at least 2.5 bar.

According to some embodiments, when operated (e.g., at a temperature according to any of the respective embodiments described herein), a relative humidity within at least a part of the fuel cell (or electrochemical cell) is at least 98%. In some such embodiments, a pressure within at least a part of the fuel cell (or electrochemical cell) is at higher than 1 bar, for example, at least 1.5 bar, at least 2 bar, or at least 2.5 bar.

According to some embodiments, when operated (e.g., at a temperature according to any of the respective embodiments described herein), a relative humidity within at least a part of the fuel cell (or electrochemical cell) is at least 99%. In some such embodiments, a pressure within at least a part of the fuel cell (or electrochemical cell) is at higher than 1 bar, for example, at least 1.5 bar, at least 2 bar, or at least 2.5 bar.

According to some embodiments, when operated (e.g., at a temperature according to any of the respective embodiments described herein), a relative humidity within at least a part of the fuel cell (or electrochemical cell) is at least 100%. In some such embodiments, a pressure within at least a part of the fuel cell (or electrochemical cell) is at higher than 1 bar, for example, at least 1.5 bar, at least 2 bar, or at least 2.5 bar.

Anion Exchange Membrane:

Anion exchange membranes (AEMs) are typically solid polymer electrolytes that conduct anions, such as $OH^-$, bicarbonate and carbonate anions. These polymer electrolytes feature positively charged cationic groups (e.g., quaternary ammonium groups) bound to at least a portion of a polymeric backbone. Any anion exchange membrane that is suitable for use in AEMFC is contemplated. However, due to the high operating temperature, and the increased anion conductivity as a result thereof, AEMs which are considered less efficient for AEMFCs can also be used.

Examples of polymeric backbones include, without limitation, polyalkylenes (e.g., polyethylene or polypropylene) and copolymers thereof, polyfluoroalkylenes (polytetrafluoroethylene) and copolymers thereof, and polystyrene and copolymers thereof. Polyethylene (e.g., low density polyethylene) and poly(ethylene-co-tetrafluoroethylene) (also referred to herein as "ETFE") are exemplary polymeric backbones. In exemplary embodiments, the cationic group is introduced to the polymer by radiation grafting.

Benzyltrimethylammonium is an exemplary cationic group, which may optionally be prepared from benzyl chloride groups (optionally grafted to a polymeric backbone) contacted with trimethylamine (e.g., as exemplified herein in the Examples section).

According to some of any of the embodiments described herein, an anion conductivity of the anion exchange membrane at the operating temperature is at least 150 mS/cm, optionally at least 200 mS/cm, optionally at least 250 mS/cm, optionally at least 300 mS/cm, optionally at least 350 mS/cm, and optionally at least 400 mS/cm. In some such embodiments, the anion conductivity is $OH^-$ conductivity.

Anion conductivity is optionally determined under conditions of 0.1 mA direct current, and constant $N_2$ flow at a pressure of 2 bar.

$OH^-$ conductivity at a given temperature is preferably determined by measuring conductivity over time until a stable value is obtained (e.g., less than 0.1 KS/change in resistance over the course of 3 hours), at a relative humidity of about 95% at 40° C., in order to ascertain that $OH^-$ anions replace other anions (e.g., bicarbonate); followed by determination of conductivity under conditions of 0.1 mA direct current, and constant $N_2$ flow at a pressure of 2 bar, as exemplified in the Examples section herein, and in accordance with the procedures described by Ziv and Dekel [*Electrochem. Commun.* 88 (2018) 109-113].

According to some of any of the embodiments described herein, the AEM features an ion exchange capacity (IEC) lower than 1, or lower than 0.8, or lower than 0.7 mmol equivalent/gram.

According to some of any of the embodiments described herein, the AEM features an ion exchange capacity that ranges from about 0.5 to about 0.8 mmol equivalent/gram.

The IEC can be defined as the milliequivalent of ion-exchange groups included in a 1 gram dry membrane (meq per gram dry membrane), and is determined by methods known in the art. The IEC is optionally determined by converting a substance from which the membrane is formed (optionally before or after formation of a membrane from the substance) to a chloride salt by submerging in aqueous NaCl solution (e.g., for 15 hours, with one refreshing of NaCl solution during this period) followed by being soaked in water to remove excess sodium and chloride ions, followed by determination of chloride content (moles per gram) by titration with silver ions (e.g., by immersing a known mass of dry substance (following conversion to the chloride salt) in aqueous $NaNO_3$ solution (e.g., for 5 hours), acidifying the solution with aqueous $HNO_3$, and titrating with aqueous $AgNO_3$ solution), according to procedures described in Wang et al. [*Green Chem.* 19 (2017) 831-843].

According to some of any of the embodiments described herein, the anion exchange membrane is a nanoporous or a sub-nanoporous membrane.

According to some of any of the embodiments described herein, the anion exchange membrane features a closed porosity, that is, it is a porous (e.g., nanoporous or sub-nanoporous) membrane featuring a plurality of small closed pores that act as "cages" (e.g., nanocages). Without being bound by any particular theory, when using AEM that features such a porous structure, at least a portion of the water (e.g., as described hereinabove) inside these pores may become liquid due to applied capillary forces.

According to some of any of the embodiments described herein, the anion exchange membrane comprises a water-absorbent material.

According to some of any of the embodiments described herein, the anion exchange membrane exhibits high affinity to water and/or high water absorbance. This can be achieved by using, for example, an AEM made of a hydrophilic or amphiphilic polymeric backbone and/or a polymeric material that features anion-conducting groups that exhibit high affinity towards water.

According to some of any of the embodiments described herein, a thickness of the anion exchange membrane ranges from 10 microns to about 50 microns. Due to the increased conductivity of the AEM at the operating temperature, AEMs featuring higher thickness can also be employed, for example, those featuring a thickness as high as 150 microns. It is to be noted that while a high thickness is often required when fuels other than hydrogen, which exhibit high cross-over, such as, for example, alcohols and ammonia, are used, the high thickness results in high resistance and thus limits the use of such fuels. AEMs featuring a thickness higher than 10 microns, or higher than 50 microns, for example, from 50 to 150 microns, are therefore beneficial for use with such fuels in accordance with the present embodiments.

According to some of any of the embodiments described herein, the AEM is characterized by at least two, or at least three, or at least four, or all five of the following features:

a) an anion conductivity (e.g., $OH^-$ conductivity) of the anion exchange membrane at the operating temperature of at least 150 mS/cm (according to any of the respective embodiments described herein);

b) an ion exchange capacity (IEC) lower than 1 (according to any of the respective embodiments described herein);

c) being a nanoporous or a sub-nanoporous membrane (according to any of the respective embodiments described herein);

d) comprising a water-absorbent material (according to any of the respective embodiments described herein); and e) a thickness of the anion exchange membrane ranges from 10 microns to about 50 microns (according to any of the respective embodiments described herein).

Anion Exchange Membrane Fuel Cell:

The fuel cell may comprise one or more anion exchange membranes (AEMs) according to any of the respective embodiments described herein; along with an anode electrode, anode catalyst and optionally other components in the anode compartment, and a cathode electrode, cathode catalyst, and optionally other components in the cathode compartment. The anode electrode, anode catalyst and other components in the anode compartment and the cathode electrode, cathode catalyst and other components in the cathode compartment, utilized in the fuel cell, can be as typically usable in AEMFCs. The fuel cell is optionally configured as shown in FIG. 10, for example, wherein each of anode and cathode compartments comprise a respective catalyst layer, a gas diffusion layer (GDL) and flow field.

Exemplary anode and cathode catalysts that are beneficially used in AEMFC include platinum group metal-based catalysts (PGM catalysts), and the catalysts are typically mixed with an ionomer that imparts ionic conductivity.

Herein, the term "ionomer" refers to a polymer wherein at least a portion of the repeating units of the polymer comprise ionic (i.e., electrically charged) groups (e.g., wherein the polymer is a copolymer comprising electrically neutral units and units comprising an ionic group).

In the context of an ionomer in an anion exchange membrane fuel cell, the ionic groups are preferably cationic groups, which promote conduction of anions via electrostatic interaction between the anions and cationic groups.

The high operating temperature of the fuel cell allows utilizing anode and cathode electrodes, which feature sub-optimal performance. For example, the anode catalyst can be such that features a sub-optimal exchange current density; the cathode catalyst can be such that features a sub-optimal kinetic current density; the anode and/or cathode electrodes can include a lower amount of an ionomer, or an ionomer which features a reduced conductivity, or be devoid of an ionomer.

According to some of any of the embodiments described herein, the anode catalyst features an exchange current density lower than 0.05 $mA/cm^2$, at 25° C.

According to some of any of the embodiments described herein, the anode catalyst features a kinetic current density lower than 0.05 $mA/cm^2$ at 0.9 V and 25° C.

According to some of any of the embodiments described herein, at least one, or both, of the anode and the cathode further comprise an ionomer, wherein an amount of the ionomer is lower than 20% by weight, of the total weight of the catalyst and/or a conductivity of the ionomer is lower than 50 mS/cm, or lower than 20 mS/cm.

According to some of any of the embodiments described herein, at least one, or both, of the anode and the cathode are devoid of an ionomer.

According to some of any of the embodiments described herein, the ionomer, if present, is stable at the operating temperature, wherein the loss of conductivity is less than 50% after 1000 hours of operation at the operating temperature.

According to some of any of the embodiments described herein, at least one, or both, of the anode catalyst and the cathode catalyst is a platinum group metal-free catalyst. In some such embodiments, the platinum group metal-free catalyst is a critical raw material-free catalyst.

Herein, the term "platinum group metal" refers to ruthenium, rhodium, palladium, osmium, iridium and platinum.

Herein, the term "critical raw material" refers to platinum group metal (as defined herein), rare earth elements, borates, chromium, cobalt, copper, lithium, magnesium, manganese, nickel, silicon, silver, strontium, titanium, vanadium, and zirconium.

Nitrogen-doped carbon (N-doped-C) is an exemplary platinum group metal-free and critical raw material-free catalyst, which may optionally be used as a cathode catalyst.

According to some of any of the embodiments described herein, a thickness of at least one, or both, of the anode and cathode electrodes is at least 50 microns, or at least 100 microns, and can range, for example, from 50 microns to 300 microns. As explained herein regarding the AEM, such a thickness should not impair the efficiency of the system due to the high conductivity that results from the operating temperature.

According to some of any of the embodiments described herein, at least one, or both, of the anode and cathode electrodes are porous, and preferably, exhibit closed porosity, as described herein for the AEM.

According to some of any of the embodiments described herein, the fuel is hydrogen, as exemplified herein. As explained hereinabove, the fuel can alternatively be an alcohol (e.g., methanol or ethanol), hydrocarbon (e.g., methane and/or other alkane), ammonia, urea, hydrazine, etc.

According to some of any of the embodiments described herein, the fuel cell, when operated at the temperature as described herein, is capable of generating an open circuit voltage higher than 0.8 V, optionally higher than 0.9 V, optionally higher than 1.0 V, and optionally higher than 1.1 V. In some such embodiments, at least one, or both, of the anode catalyst and the cathode catalyst is a platinum group metal-free catalyst, optionally a critical raw material-free catalyst.

According to some of any of the embodiments described herein, the fuel cell, when operated at the temperature as described herein, is capable of generating a current density at 0.65 V which is higher than 500 $mA/cm^2$, optionally higher than 750 $mA/cm^2$, optionally higher than 1000 $mA/cm^2$, optionally higher than 1250 $mA/cm^2$, and optionally higher than 1500 $mA/cm^2$. In some such embodiments, at least one, or both, of the anode catalyst and the cathode catalyst is a platinum group metal-free catalyst, optionally a critical raw material-free catalyst.

According to some of any of the embodiments described herein, the fuel cell, when operated at the temperature as described herein, is capable of generating a current density at 0.8 V which is higher than 500 $mA/cm^2$, optionally higher than 750 $mA/cm^2$, and optionally higher than 1000 $mA/cm^2$. In some such embodiments, at least one, or both, of the anode catalyst and the cathode catalyst is a platinum group metal-free catalyst, optionally a critical raw material-free catalyst.

According to some of any of the embodiments described herein, the fuel cell, when operated at the temperature as described herein, is capable of generating a peak power density higher than 1.0 $W/cm^2$, optionally higher than 1.5 $W/cm^2$, optionally higher than 2.0 $W/cm^2$, and optionally higher than 2.5 $W/cm^2$. In some such embodiments, at least one, or both, of the anode catalyst and the cathode catalyst is a platinum group metal-free catalyst, optionally a critical raw material-free catalyst.

According to some of any of the embodiments described herein, the fuel cell, when operated at the temperature as described herein, is characterized by a limiting current density of the anion exchange membrane fuel cell is higher than 2.5 $A/cm^2$, optionally higher than 3 $A/cm^2$, optionally higher than 4 $A/cm^2$, optionally higher than 5 $A/cm^2$, and optionally higher than 6 $A/cm^2$. In some such embodiments, at least one, or both, of the anode catalyst and the cathode catalyst is a platinum group metal-free catalyst, optionally a critical raw material-free catalyst.

Herein, the term "limiting current density" refers to the maximal current density of a fuel cell at low cell voltages, e.g., at a cell voltage approaching zero.

According to some of any of the embodiments described herein, the fuel cell, when operated at the temperature as described herein, is capable of generating an open circuit voltage higher than 0.8 V (according to any of the respective embodiments described herein) and a current density at 0.65 V which is higher than 500 $mA/cm^2$ (according to any of the respective embodiments described herein). In some such embodiments, current density at 0.8 V which is higher than 500 $mA/cm^2$ (according to any of the respective embodiments described herein). In some of any of the aforementioned embodiments, a limiting current density of the anion exchange membrane fuel cell is higher than 2.5 $A/cm^2$ (according to any of the respective embodiments described herein). In some of any of the aforementioned embodiments, at least one, or both, of the anode catalyst and the cathode catalyst is a platinum group metal-free catalyst, optionally a critical raw material-free catalyst.

According to some of any of the embodiments described herein, the fuel cell, when operated at the temperature as described herein, is capable of generating a peak power density higher than 1.0 $W/cm^2$ (according to any of the respective embodiments described herein) and a current density at 0.65 V which is higher than 500 $mA/cm^2$ (according to any of the respective embodiments described herein). In some of any of the aforementioned embodiments, a limiting current density of the anion exchange membrane fuel cell is higher than 2.5 $A/cm^2$ (according to any of the respective embodiments described herein). In some of any of the aforementioned embodiments, at least one, or both, of the anode catalyst and the cathode catalyst is a platinum group metal-free catalyst, optionally a critical raw material-free catalyst.

According to some of any of the embodiments described herein, the fuel cell, when operated at the temperature as described herein, is capable of generating a peak power density higher than 1.0 $W/cm^2$ (according to any of the respective embodiments described herein), an open circuit voltage higher than 0.8 V (according to any of the respective embodiments described herein) and a current density at 0.65 V which is higher than 500 $mA/cm^2$ (according to any of the respective embodiments described herein). In some such embodiments, current density at 0.8 V which is higher than 500 $mA/cm^2$ (according to any of the respective embodiments described herein). In some of any of the aforementioned embodiments, a limiting current density of the anion exchange membrane fuel cell is higher than 2.5 $A/cm^2$ (according to any of the respective embodiments described herein). In some of any of the aforementioned embodiments, at least one, or both, of the anode catalyst and the cathode catalyst is a platinum group metal-free catalyst, optionally a critical raw material-free catalyst.

According to embodiments of the present invention, there is provided an AEMFC that comprises an anode compartment, a cathode compartment and an anion exchange membrane sandwiched therebetween, in which the anion exchange membrane is as described herein in any of the respective embodiments, and/or the anode electrode, anode catalyst and other components in the anode compartment and the cathode electrode, cathode catalyst and other components in the cathode compartment, are as described herein in any of the respective embodiments. Such a fuel cell is operable at a temperature of at least 100° C., as described herein.

Systems and Additional Uses:

According to embodiments of the present invention there are provided electrochemical cell systems, which comprise an electrochemical cell (e.g., AEMFC) as described herein, and devices operated by the electrochemical cell (e.g., AEMFC) of a system containing same.

For example, an electrochemical cell or electrochemical cell system as described herein can be used to in situ generate electric energy to power EVs, UAVs, and other autonomous vehicles and/or systems, as well as for combined heat and power (CHP) systems to power and heat residential homes.

Generally, the electrochemical cell can be incorporated in any electrically driven or hybrid electric (namely, driven by electrical and at least one additional form of energy) system or device, or can be in electrical communication with the system or device for operating it. Systems and devices incorporating the electrochemical cell as described herein can be stationary or movable, portable or non-portable. In some embodiments, the electrochemical cell system is incorporated in a power source, which is adapted to power the electrically driven system or device. The size, shape and output of the electrochemical cell is preferably adapted to the application, which consumes its energy.

Herein, the phrase "electrically driven system or device" and "electricity consuming system or device" are used interchangeably.

One type of application which can incorporate the electrochemical cell according to some embodiments of the present invention is an electrically driven or hybrid electric vehicle. One example of a vehicle suitable for the present embodiments is an automobile such as, but not limited to, a car, a bus, a forklift, a self-balancing personal transporter, a motorcycle, a mobility scooter, a two- three- or four-wheel scooter, a saddle-ride type vehicle. Another example is an unmanned utility vehicle, such as, but not limited to, an autonomous lawn mower, an autonomous pool cleaner and the like. An additional example is an elevated altitude manned or unmanned vehicle, such as, but not limited to, an aircraft, a high altitude aircraft, a rocket and a spacecraft. A further example is a manned or unmanned underwater or above-water vehicle.

The electrochemical cell described herein can also be incorporated in distributed power source such as, but not limited to, a cogeneration system or a stationary power plant for a house, a public structure an industrial facility. Also contemplated are various appliances typically used in emergency situations, including, without limitation, emergency kits, emergency power supplies, emergency lights, backup generators and the like.

The electrochemical cell as presented herein can be further used as a component in a power source in a location, such as, but not limited to, spacecraft, weather station, park, rural location and the like. The electrochemical cells presented herein can be further used in combined heat and power systems.

In some embodiments, the electrochemical cell systems described herein are utilized in a method for powering an electrically-driven or electricity-consuming system or device, as described herein. The powering is effected by establishing electrical communication (e.g., connecting) between the electrochemical cell system and the electricity-consuming system or device.

It is expected that during the life of a patent maturing from this application many relevant AEMs, electrodes, cathode catalysts, anode catalysts, and ionomers will be developed and the scope of each of these terms is intended to include all such new technologies a priori.

As used herein the term "about" refers to ±10% or ±5%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

Example 1

Membrane Electrode Assembly

Materials:

Carbon Black (Vulcan XC 72) was purchased from Cabot Corporation.

PtRu/C catalyst (40% Pt and 20% Ru on carbon black, HiSPEC® 10000) and Pt/C catalyst (40% Pt on carbon black, HiSPEC® 4000) were purchased from Alfa Aesar.

A radiation-grafted anion-exchange membrane (AEM) containing covalently-bonded benzyltrimethylammonium (BTMA) head-groups (ion-exchange capacity of 2.49±0.12 mmol/gram and 55 μm hydrated thickness), fabricated from 25 μm thick low-density polyethylene (LDPE) [Wang et al., Energy Environ. Sci. 10 (2017) 2154-2167], was provided by the University of Surrey (UK). This AEM is also referred to herein as LDPE-BTMA.

Anion-exchange ionomer (AEI), Fumion® anion exchange resin, was obtained from Fumatech BWT GmbH (Germany).

Toray carbon paper, TGP-H-060 with 5 wt % PTFE wet-proofing was purchased from FuelCellStore.

Membrane Electrode Assembly Fabrication:

The gas diffusion electrode method was employed to prepare the anode and cathode electrodes for AEMFC testing, following previously described procedures [Huang et al., *J. Memb.* Sci. 597 (2020) 117769; Praats et al., *J. Solid State Electrochem.* 25 (2021) 57-71; Omasta et al., *J. Electrochem. Soc.* 165 (2018) J3039-J3044]. In brief, for the anode, 12 mg of PtRu/C catalyst was combined with 5 mg of AEI and 6 mg of XC 72 carbon and ground with a mortar and pestle. One-part of deionized water and nine-parts of isopropanol were added to the mixture and further ground to create a slurry. For the cathode, Pt/C catalyst was prepared in a similar manner to the anode, but without the addition of Carbon Black.

Gas diffusion layers were cut for the anode and cathode, to active area size of 5 $cm^2$. After ultra-sonicating the inks at 180 W, 37 kHz, for 1 hour in a Elmasonic P 60 H ultrasonic bath filled with water and ice to keep the temperature below 10° C., they were sprayed directly onto the gas diffusion layers with an Iwata HP-TH professional airbrush. The anode and cathode were loaded to 0.7±0.05 mg PtRu per $cm^2$ and 0.7±0.05 mg Pt per $cm^2$, respectively.

The electrodes along with a 12.25 $cm^2$ piece of the LDPE-BTMA AEM were immersed in aqueous 1 M KOH solution for 1 hour, with solution changes every 20 min, to convert to hydroxide form. The AEMFC was then assembled in situ between two 5 $cm^2$ single-serpentine graphite bipolar flow field plates and pressed using a 4.5 N m torque.

Example 2

Anion Conductivity at High Temperature

True $OH^-$ conductivity of the AEM at the relevant temperature was determined according to previously described procedures [Ziv et al., *ChemSusChem* 11 (2018) 1136-1150; Ziv and Dekel, *Electrochem. Commun.* 88 (2018) 109-113; Müller et al., *ACS Mater. Lett.* 2 (2020) 168-173]. In brief, the AEM in its bicarbonate form was located into a four-probe electrode (MTS 740, Scribner Associates Inc.) for measuring the anion conductivity. The bicarbonate conductivity was first measured for a few hours to ensure the stabilization of the membrane in the temperature and humidity atmosphere. Through the external electrodes, a constant direct current of 0.1 mA was then applied to the membrane under $N_2$ flow at 40° C. and relative humidity (RH) of 95%. The anion conductivity was continuously measured until conductivity reached a stable value (<0.1 KS) change in resistance over three hours). This stable value is taken as the "true hydroxide conductivity". After reaching the true hydroxide conductivity value at 40° C., the temperature was rapidly increased to 110° C., while a constant $N_2$ flow at a pressure of 2 bar was used. The true hydroxide conductivity was then continuously monitored to test the AEM stability at 110° C.

The obtained data is presented in FIG. 1A. As can be seen in FIG. 1A, at 40° C. the true hydroxide conductivity reaches a very high value of 130 mS/cm. This high conductivity is consistent with previously reported values [Wang et al., *Energy Environ. Sci.* 10 (2017) 2154-2167; and Müller et al., *ACS Mater. Lett.* 2 (2020) 168-173].

As it is known that the hydroxide conductivity increases with the temperature, the temperature was increased to above 100° C. for measuring the true hydroxide conductivity. As can be further seen in FIG. 1A, at the high temperature of 110° C., the AEM reaches an outstanding high hydroxide conductivity value of 290 mS/cm. While at this temperature the reading tends to be slightly noisy (similar to that measured in previous reports), the AEM shows noteworthy stability at this temperature, as shown by the steady true hydroxide conductivity measured for more than 24 hours during the test time (see, FIG. 1A).

In another set of experiments, the true $OH^-$ conductivity was measured using the same protocol while applying different temperatures. The anion conductivity values of the LDPE-BTMA AEM during the de-carbonation process over time are shown in FIG. 1B. During the first hours (<5 hours), the membrane stabilizes with the temperature (40° C.) and humidity (95% relative humidity). The $HCO_3^-$ conductivity is determined as the average value of the conductivity after it reached a steady value. Afterward, a direct current of 0.1 mA was applied, triggering water electrolysis onto the membrane surface, producing $OH^-$ ions. This process causes the anion conductivity to rise gradually, as it can be seen by the exponential-like curve (FIG. 1B). The $OH^-$ ions migrate through the AEM to the anode electrode purging the (bi) carbonate ions out of the membrane in the form of $CO_2$. As can be further seen in FIG. 1B, at the high temperature of 120° C., the AEM reaches an outstanding high hydroxide conductivity value of above 300 mS/cm.

Example 3

Anion-Exchange Membrane Fuel Cell Testing

The AEMFC was tested in an 850E Scribner Associates Fuel Cell test station. The cell temperature was first heated up while flowing $N_2$ at 0.5 slpm (standard liter per minute) and allowed to stabilize at 60° C., then fed with pure humidified $H_2$ and $O_2$ reactant gases at flow rates of 1 slpm without back-pressurization. The cell voltage was decreased to 0.4 V at which point the anode and cathode dew points were optimized until a stable, maximum current density of 4 A/cm$^2$ was obtained. Then, the cell temperature and dew points were increased to 60° C., 80° C. or 110° C. and, for the 80° C. or 110° C., backpressures increased to about 1.5 barg (about 2.5 bara) on both electrodes to obtain a maximum current density of 6 A/cm$^2$ at 0.4 V. A polarization curve of the AEMFC was recorded at a scan rate of 5 mV/second (fast test to capture beginning-of-life performance to mitigate against any degradation-related power loss). Immediately thereafter, the cell was subjected to stability testing at the same operating conditions and under a constant load of 0.2 A/cm$^2$.

FIG. 2A shows the resulting polarization curve at 110° C. As can be seen, the cell reached a high performance with a peak power density of 2.1 W/cm$^2$ measured at 0.51 V. The kinetic region of the AEMFC displays a very high catalytic performance, exhibiting an open circuit voltage (OCV) of 1.02 V and a current density of as high as 574 mA/cm$^2$ at 0.8 V (see insert in FIG. 2A). This is significantly higher than the values reported in the literature for the well-studied acidic high-temperature PEMFCs [See, for example, Bin Jung et al., *Int. J. Hydrogen Energy.* 33 (2008) 2413; XiaoJin Li et al., High Temperature PEM Fuel Cells Based on Nafion®/SiO2 Composite Membrane, Energy Storage in the Emerging Era of Smart Grids, Prof. Rosario Carbone (Ed.), InTech, 2009; Wang et al., Electrochim. Acta. 152 (2015) 443-455; Hooshyari et al., Electrochim. Acta. 205 (2016) 142-152; Lee, et al., Energy and Fuels. 31 (2017) 7645-7652; Zhang et al., J. Memb. Sci. 572 (2019) 496-503]. OCV values of 0.95-0.96 V and current densities (measured at 0.8 V) of 70-300 mA/cm$^2$ were reported for acidic high-temperature PEMFC operated at 100-120° C.

FIG. 2B presents comparative polarizations curves at the three tested temperatures, showing the improved performance at an operating temperature of 110° C.

The strong performance from the kinetic region extended into the ohmic region of the fuel cell attributing to the high voltage efficiency achieved in the AEMFC at this high operating temperature. In the higher current density, mass transport region of the cell, the performance is mostly dictated by minimizing mass-transport losses by effectively managing the water within the cell. Also in this region the cell performs very well, reaching a very high limiting current density of 6.1 A/cm$^2$ at about 0.2 V.

The initial and final area-specific resistance (ASR) values during the acquisition of the polarization curve (0.019 and 0.036 Ωcm$^2$, respectively, shown at the bottom of FIG. 2A), are among the lowest achieved for AEMFCs. These low values suggest that the water supply across the AEM is enough to reduce the cell resistance, while supplying high current densities at this extreme temperature of 110° C.

FIGS. 2C-F are comparative tables presenting the measured open circuit values (FIG. 2C); the extracted current density (A/cm$^2$) values at critical voltage in the kinetic regions (FIG. 2D); the extracted current density (A/cm$^2$) values at critical voltage in the Ohmic regions (FIG. 2E); and the extracted current density (A/cm$^2$) values at critical voltage in the Mass Transport regions (FIG. 2F) at each of the tested temperatures.

FIG. 3 is a bar graph presenting the peak power density of the AEMFC of FIGS. 2A-F, at each of the tested temperatures.

These data show the improved performance the cell when operated at 110° C. compared to lower temperatures, at each tested parameter, Following the acquisition of the AEMFC polarization data at 110° C., a constant current density load of 0.2 A/cm$^2$ with the same gas flow rates, dew point settings, and back-pressurization was applied to the cell.

The obtained data is presented in FIG. 4 and shown that relatively good voltage stability was achieved, with a relatively slow rate of decay for 50 hours of operation at 110° C.

In an additional set of experiments, conducted with the same AEMFC (referred to as MEA #2, reproducibility has been demonstrated, as shown in FIGS. 5A-D.

The same improved performance was also demonstrated when other AEMs were used (data not shown). These data show that AEMs usable for practicing embodiments of the present invention include, but are not limited to, commercially available membranes such as A201 AEM (Tokuyama, Japan), Sustainion (Dioxide Materials, USA), and FAA3 and similar membranes by Fumatech.

It is noted that this excellent performance of the AEMFC was obtained without any optimization, and therefore an even better performance is expected upon optimization.

The outstanding performance and in situ stability are shown here for the first time for AEMFCs operating above 100° C.

Without being bound by any particular theory, it is believed that the surprising stability at elevated temperatures such as described herein is associated with enhanced membrane water diffusivity leading to higher cathode hydration levels, which in turn promotes slower degradation kinetics [Yassin et al., *J. Membrane Sci.* 608 (2020), 118206]; and that this effect compensates for (and may even dominate) the expected direct enhancement of degradation kinetics at elevated temperatures.

Example 4

ETFE-BTMA-Based Anion-Exchange Membrane and Fuel Cell Comprising Thereof

A radiation-grafted polyethylene tetrafluoroethylene (ETFE)-based benzyltrimethylammonium (BTMA)-type AEM (ion exchange capacity (IEC)=2.11±0.11 mmol/gram, 50 μm hydrated thickness) [Wang et al., *Green Chem.* 19 (2017) 831-843] was prepared, and true hydroxide conductivity was determined, according to procedures such as described hereinabove.

In brief, the AEM was synthesized by exposing preformed ETFE film to a 30 kGy radiation dose, followed by grafting with vinylbenzyl chloride and a final amination step with trimethylamine aqueous solution (45 wt %) to form the radiation grafted AEM (ETFE-BTMA-based AEM). After establishing a stable true hydroxide conductivity at 60° C., 90% relative humidity (RH), and 0.85 barg back-pressure, the temperature was increased to 80° C. and then 105° C. The activation energy ($E_a$) was estimated via temperature-dependent conductivity, which follows the Arrhenius behavior expressed by Eq. (1):

$$\sigma = \sigma_0 \exp\left(-\frac{Ea}{k_B T}\right) \quad (1)$$

where $\sigma_o$ is the pre-exponential factor (mS/cm$^1$), T the absolute temperature (K), Ea the activation energy (kJ/mol), and $k_B$ is Boltzmann's constant (kJ/K).

As shown in FIG. 6A, following 1 hour of stabilization at 60° C. (AEM started off in its bicarbonate form), a direct current of 0.1 mA was applied, and the conductivity rapidly increased.

This result indicates that $OH^-$ generated via water electrolysis purges $HCO_3^-$ to from the AEM via $CO_2$ evolution, wherein the rapid conductivity increase is associated with the higher mobility $OH^-$ ions.

As further shown in FIG. 6A, after 30-40 hours, the AEM exhibited a stable conductivity plateau, indicating that it was in its true $OH^-$ form, yielding a true $OH^-$ conductivity of about 166 mS/cm (as compared to the 152 mS/cm reported by Zhegur et al. [*ACS Appl. Polym. Mater.* 2 (2020) 360-367]).

As further shown in FIG. 6A, a sharp increase of the conductivity values was initially seen as the temperature was raised to 80° C., followed by an increase to 105° C.

As shown in FIG. 6B, the activation energy ($E_a$), calculated from the true $OH^-$ conductivity of the AEM, was 4.5 kJ/mol (0.045 eV).

As shown in Table 1, the abovementioned activation energy is among the lowest reported for AEMs, and is even lower than that of the Nafion® $H^+$-conducting membrane. For example, Paul et al. [*J. Electrochem. Soc.* 161 (2014) F1395-F1402] measured $E_a$ values ranging from 9 to kJ/mol, while Matos et al. [*Appl. Phys. Lett.* 104 (2014) 091904] obtained values ranging from 5.9 to 10.6 kJ/mol. A low $E_a$ value is preferable, as it indicates a lower barrier for the $OH^-$ conduction. Additionally, the higher kinetic energy of the $OH^-$ ions and the increased hydration levels at the high temperature (formation of continuous hydrated ion-conducting channels through the AEM [Wang et al., *Polymer (Guildf).* 138 (2018) 363-368]) further contribute to the low $E_a$ values, all of which is consistent with $OH^-$ transport occurring via a Grotthuss-type mechanism [Gao et al., *J. Mater. Chem. A.* 4 (2016) 13316-13326].

TABLE 1

Comparison of hydroxide ion transport $E_a$ value for exemplary AEM and reported $E_a$ values of AEMs (some of the Ea values are given as a range as they were characterized according to various physical characteristics, e.g. radiation doses, or composition ratios).

| Membrane type | Testing temperature (° C.) | $E_a$ (kJ/mol) | Source |
|---|---|---|---|
| ETFE-BTMA | 60-105 | 4.55 ± 0.58 | Described herein |
| TMA (tetra-alkyl ammonium cations) | 25-80 | 3.40 ± 1.24 | Sarode et al. [*J. Phys. Chem. B* 118 (2014) 1363-1372] |
| LC nanostructures AEMs (AEM-H1 AEM-La) | 20-80 | 4.21-5.49 | Gao et al. [*J. Mater. Chem. A* 4 (2016) 13316-13326] |
| GVD-PET based AEMs with epoxy ring and C—Cl Bond | 20-60 | 10.4-19.1 | Jeong et al. [*Energies* 8 (2015) 7084-7099] |
| ETFE-VBC | 30-80 | 10.6-13.7 | Fang et al. [*Int. J. Hydrogen Energy* 37 (2012) 594-602] |
| Imidazolium functionalized PEEK-based AEMs | 20, 60 | 10.9-23.5 | Li et al. [*Chinese J. Chem. Eng.* 26 (2018) 2130-2138] |
| LDPE-g-VBC-TMA | 20-80 | 12 | Espiritu et al. [*J. Mater. Chem. A* 5 (2017) 1248-1267] |
| Rigid polyaromatic (polysulfone-based) AEMs | 30-70 | 12.1-25.1 | Yan & Hickner [*Macromolecules* 43 (2010) 2349-2356] |
| MDPA AEMs | 30-80 | 14.98-16.88 | Irfan et al. [*J. Power Sources* 355 (2017) 171-180] |
| Poly(ether sulfones)-based AEMs TRP-100 TRP-0 | 20-80 | 16.3-18.4 | Kim et al. [*ACS Appl. Mater. Interfaces* 9 (2017) 42409-42414] |

This result indicates that the high relative humidity facilitates an increase in the amount of water absorbed by the membrane. After a short time, the relative humidity stabilizes at the set-point of 90%, and the water inside the membrane rebalances, resulting in the stabilization of conductivity measurements.

As further shown in FIG. 6A, The AEM's true $OH^-$ conductivity increases with temperature, and values of 190 and 201 mS cm$^{-1}$ were obtained at 80° C. and 105° C., respectively, which is among the highest values reported for AEMs.

These results indicate that the high temperature utilized herein results in exceptionally high true $OH^-$ conductivity and low activation energy for AEMs.

Example 5

ETFE-BTMA-Based Anion-Exchange Membrane and Fuel Cell Comprising Thereof

An AEMFC was prepared using the exemplary ETFE-BTMA-based AEM described in Example 4. Gas diffusion electrodes (GDEs) were prepared by adapting the procedures described in Example 1. Briefly, the anode was made with PtRu/C, while the cathode contained 35 mg of N-doped-C (as shown in FIG. 7); both contained 15 mg of Fumion® polyaromatic anion exchange ionomer functionalized with quaternary ammonium groups (IEC=2.0 meq/gram). The mixture was ground in one-part ultra-pure water and nine-parts of isopropyl alcohol to create the catalyst ink. 5 $cm^2$ active area anode and cathode GDEs were loaded to 0.7 mg PtRu per $cm^2$ and 1.11 mg N-doped-C per $cm^2$, respectively. Their exemplary loadings with respect to critical raw material (CRM) content are summarized in Table 2.

TABLE 2

Exemplary catalyst loadings for electrodes with respect to critical raw material (CRM) content.

| | PtRu/C anode | N-doped-C cathode |
|---|---|---|
| CRM content (wt %) | 40 | 0 |
| Total catalyst loading ($mg/cm^2$) | 1.75 | 1.11 |
| CRM loading ($mg/cm^2$) | 0.7 | 0 |

Both GDEs along with a 9 $cm^2$ piece of a ETFE-BTMA-based-AEM were immersed in petri dishes filled with aqueous 1 M KOH solution for 1 hour, with solution changes every 20 minutes. They were then assembled into an AEMFC between two 5 $cm^2$ single-serpentine graphite bipolar flow field plates with a torque of 4.5 N m.

The $H_2/O_2$ performance of in operando AEMFC containing an exemplary (CRM-free) N-doped-C cathode was then evaluated at 60° C., 80° C., and 105° C. The AEMFC start-up testing protocol used was similar to that described hereinabove, where a stable, maximum current density of 1.5 $A/cm^2$ was obtained at 60° C. before testing. An initial polarization curve was then recorded at a scan rate of 5 mV/second to quickly capture beginning-of-life performance. Following this, the current was set to 3 A and the corresponding voltage was allowed to stabilize for about 3 minutes. Then an electrochemical impedance spectrum (EIS) was recorded (f scan 10,000 to 0.1 Hz with 20 steps per decade and an AC amplitude perturbation of 5% of the current). The polarization curve and cell impedance scans were repeated in a similar manner after the cell temperature was increased to 80° C. (optimized dew points and a backpressure of 1 barg). Finally, the cell temperature was increased to 105° C. (further optimized dew points and a back-pressure of 1.4 barg). After these tests, the cathode gas was switched from $O_2$ to $N_2$ (15 minute flow at the open circuit voltage (OCV)) to purge all traces of $O_2$. An initial cyclic voltammogram (CV) was then recorded (between 0.05 and 1 V at 100 mV/second). The cathode gas was then reverted to $O_2$ (until a stable high OCV was attained) before discharging the cell at a current density of 500 $mA/cm^2$ for 10 hours. Finally, following this voltage stability test, a second CV (after $N_2$ purge) was recorded from the cathode, where the initial and final surface areas were compared using Eq. (2) [Kar et al., *RSC Adv.* 4 (2014) 57781-57790]:

$$C = \frac{\int IdV}{2mvdV} \quad (2)$$

where C is the capacitance (F/gram), dV is the potential range (V), IdV is the area under the cyclic voltammogram, m is the mass (grams), and v is the scan rate (V/second).

The optimized dew points used in the study are summarized in Table 3:

TABLE 3

Optimized anode and cathode dew point temperatures for each cell temperature

| Cell temperature (° C.) | Anode dew point temperature (° C.) | Cathode dew point temperature (° C.) |
|---|---|---|
| 105 | 99.0 | 99.0 |
| 80 | 71.7 | 73.6 |
| 60 | 53.5 | 55.4 |

Similarly to the results for Pt-based cathodes presented in Example 3, operating above 100° C. led to significant improvements.

As shown in FIG. 8A, the limiting current density increased from about 2.2 $A/cm^2$ at 80° C. to about 3.0 $A/cm^2$ at 105° C.; and the current density at 0.65 V increased from 850 at 80° C. to 1170 $mA/cm^2$ at 105° C.

Without being bound by any particular theory, it is believed that this result relates to enhanced catalytic activity in the kinetic region (see for example, the inset of FIG. 8A, and the values presented by Table 4 below, presenting a detailed comparison of cell performance in the kinetic region of each IV curve). It is further believed that this enhancement extends into the ohmic region, where the high temperatures lead to higher $OH^-$ conductivity (see for example, FIGS. 8A and 8B).

TABLE 4

Comparison of the three IV curves at specified current densities.

| Cell | Current density ($mA/cm^2$) | | |
|---|---|---|---|
| temperature (° C.) | at 0.85 V | at 0.75 V | at 0.65 V |
| 105 | 60 | 380 | 1,170 |
| 80 | 50 | 370 | 850 |
| 60 | 40 | 270 | 650 |

These results are the first reported high-temperature AEMFC with a CRM-free cathode. The values of $P_{max}$=1.14 $W/cm^2$ (FIG. 8B), limiting current density=2.93 $A/cm^2$, and current density=2.28 $A/cm^2$ at 0.6 V, each compare favorably with corresponding data reported for AEMFCs containing CRM-free cathodes and platinum group metal-free cathodes (albeit at lower test temperatures). For example, Lu et al. [*J. Power Sources* 372 (2017) 82-90] reported $P_{max}$ and current density values (at 60° C.) of 0.70 $W/cm^2$ and 1.0 $A/cm^2$ at 0.60 V, respectively, using a Halloysite-derived furfural urea N-doped-C cathode (1.0 mg catalyst per $cm^2$). Pham et al. [*Adv. Sustain. Syst.* 1 (2017) 1600038] reported $P_{max}$ and current density values (at 85° C.) of 0.05 $W/cm^2$ and 0.02 $A/cm^2$, respectively, at 0.60 V, using a F-, N-, and S-tri-doped reduced graphene oxide cathode (1.5 mg catalyst per $cm^2$).

The performance of this exemplary CRM-free-cathode high-temperature AEMFC in the kinetic (low current density) region is already comparable to the state-of-the-art proton exchange membrane fuel cells (PEMFCs) and superior to reported high-temperature PEMFCs with platinum group metal-free cathodes under $H_2/O_2$ gas flows [Osmieri et al., *Curr. Opin. Electrochem.* 25 (2021) 200627]. For example, Fu et al. [*Adv. Mater.* 29 (2017) 1604456] reported a $P_{max}$ of 1.06 $W/cm^2$, a limiting current density of 3.4 $A/cm^2$, and a current density of 1.5 $A/cm^2$ at 0.60 V (employing a 3D-porous Fe—N—C catalyst tested at 80° C.); and reported high-temperature PEMFC current densities at 0.6 V are less than 0.25 $A/cm^2$ for cells operated at 120-180° C. [Gokhale et al., *Electrochem. Commun.* 93 (2018) 91-94; Hu et al., *Appl. Catal. B Environ.* 234 (2018) 357-364; Li et al., *Adv. Mater.* 32 (2020) 1-20; Cheng et al., *Adv. Sci.* 6 (2019) 1802066; Haider et al., *Chem. Soc. Rev.* 50 (2021) 1138-1187; www(dot)hydrogen(dot)energy(dot) gov/pdfs/review17/fc132_mukerjee_2017_o(dot)pdf], compared to 2.28 A/cm$^2$ for the exemplary high-temperature AEMFC at 105° C.

In addition, as shown in FIG. 8C, a lower mean area-specific resistance (ASR) of 0.04 Ωcm$^2$ was observed at 105° C. during the acquisition of the polarization curve.

These combined improvements gave a 50% increase in $P_{max}$ from 0.76 W/cm$^2$ to 1.14 W/cm$^2$ when moving from 80° C. to 105° C.

As shown in FIG. 9A, upon increasing the operating temperature from 60° C. to 105° C., the low-frequency resistance decreased gradually from 0.05 to 0.028 Ωcm$^2$ (as determined by electric impedance spectrum measurements in $H_2/O_2$ flow conditions under a current load of 600 mA/cm$^2$).

These results may be attributed to the improved catalytic processes. This trend is congruent with the understanding that as the kinetic energy of the reactants increases due to temperature, they overcome the activation energy barrier more easily thereby improving the rate of reaction. This observation is further supported by improved catalytic performances of both the hydrogen oxidation and oxygen reduction reactions with increasing temperature [Li et al., *Angew. Chemie—Int. Ed.* 58 (2019) 1442-1446; Lim et al., *Science* 324 (2009) 1302-1305]. A corresponding decrease in the high-frequency resistance from 0.017 to 0.01 Ωcm$^2$ is due to the increased $OH^-$ conductivity through the AEM (as discussed above), coupled with the overall lower ohmic resistance of the cell. This is in line with the improved cell performance, further reflecting both the improved conductivity and reaction kinetics at higher temperature. These in situ resistances are about four times lower than those reported for AEMFCs operated at 60° C. with high-performance platinum group metal-free cathodes [Lilloja et al., *Appl. Catal. B Environ.* 272 (2020) 119012].

In addition, an initial 10 hour high-temperature stability test was performed at a constant current density discharge of 500 mA/cm$^2$.

As shown in FIG. 9B, a voltage degradation of 14 mV/hour was observed in the high-temperature stability test.

This stability is expected to improve with optimized materials and high-temperature AEMFC operating parameters.

In order to further probe degradation, in situ CV tests of the N-doped-C cathode were performed both before and after the 10 hour constant current density test, to evaluate any capacitance changes.

As shown in FIG. 9C, 81% retention of the total capacitance was observed.

This result suggests that the cathode catalyst is relatively stable, and that the decrease in the cell performance cannot solely be attributed to the catalyst. AEM and ionomer degradation may also play a role in the performance loss at these temperatures.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of operating an anion exchange membrane fuel cell comprising an anion exchange membrane sandwiched between an anode compartment and a cathode compartment, wherein said cathode compartment comprises a cathode electrode which comprises a cathode catalyst for promoting reduction of an oxidant to thereby generate anions and said anode compartment comprises an anode electrode which comprises an anode catalyst for promoting oxidation of a fuel, the method comprising contacting said cathode compartment with said oxidant, contacting said anode compartment with said fuel, and adjusting the operating temperature of the anion exchange membrane fuel cell to at least 100° C., wherein said anion exchange membrane conducts anions from said cathode compartment to said anode compartment and is a nanoporous or sub-nanoporous membrane featuring closed porosity and capable of applying capillary forces that liquefy at least a portion of the water therewithin.

2. The method of claim 1, wherein the fuel cell is operated under conditions in which at least a portion of the water that is generated and/or consumed is in a liquid state at said temperature.

3. The method of claim 1, wherein at least one, or both, of said anode catalyst and said cathode catalyst is a platinum group metal-free catalyst.

4. The method of claim 1, wherein at least one, or both, of said anode compartment and said cathode compartment is devoid of an ionomer and/or further comprise an ionomer, wherein an amount of said ionomer is lower than 20% by weight of the total weight of the catalyst and/or a conductivity of said ionomer is lower than 50 mS/cm.

5. A fuel cell comprising an anion exchange membrane sandwiched between an anode compartment and a cathode compartment, wherein said cathode compartment comprises a cathode catalyst for promoting reduction of an oxidant to thereby generate anions and said anode compartment comprises an anode catalyst for promoting oxidation of a fuel, the fuel cell being operable at an operating temperature of at least 100° C., wherein said anion exchange membrane conducts anions from said cathode compartment to said anode compartment and is a nanoporous or sub-nanoporous membrane featuring closed porosity and capable of applying capillary forces that liquefy at least a portion of the water therewithin.

6. The fuel cell of claim 5, wherein at least one, or both, of said anode catalyst and said cathode catalyst is a platinum group metal-free catalyst.

7. The fuel cell of claim 5, wherein said anode catalyst features an exchange current density lower than 0.05 mA/cm$^2$ at 25° C.; and/or wherein said cathode catalyst features a kinetic current density lower than 0.50 mA/mg at 0.9 V and 25° C.

8. The fuel cell of claim 5, wherein at least one, or both, of said anode compartment and said cathode compartment is devoid of an ionomer and/or further comprise an ionomer, wherein an amount of said ionomer is lower than 20% by weight of the total weight of the catalyst and/or a conductivity of said ionomer is lower than 50 mS/cm.

9. The fuel cell of claim 5, wherein at least one, or both, of said anode and cathode electrodes exhibit closed porosity.

10. The fuel cell of claim 5, wherein said fuel is hydrogen.

11. An anion exchange membrane electrode assembly comprising an anion exchange membrane sandwiched between an anode compartment and a cathode compartment, wherein said cathode compartment comprises a cathode electrode which comprises a cathode catalyst for promoting reduction of an oxidant to thereby generate anions and said anode compartment comprises an anode electrode and an anode catalyst for promoting an electrochemical reaction, wherein said anion exchange membrane conducts anions from said cathode compartment to said anode compartment and is a nanoporous or sub-nanoporous membrane featuring closed porosity and capable of applying capillary forces that liquefy at least a portion of the water therewithin.

12. The anion exchange membrane electrode assembly of claim 11, wherein at least one, or both, of said anode catalyst and said cathode catalyst is a platinum group metal-free catalyst.

13. The anion exchange membrane electrode assembly of claim 11, wherein said anode catalyst features an exchange current density lower than 0.05 mA/cm$^2$ at 25° C.; and/or wherein said cathode catalyst features a kinetic current density lower than 0.50 mA/mg at 0.9 V and 25° C.

14. The anion exchange membrane electrode assembly of claim 11, wherein at least one, or both, of said anode compartment and said cathode compartment is devoid of an ionomer and/or further comprise an ionomer, wherein an amount of said ionomer is lower than 20% by weight of the total weight of the catalyst and/or a conductivity of said ionomer is lower than 50 mS/cm.

15. An electrochemical cell comprising the anion exchange membrane electrode assembly of claim 11, the electrochemical cell is being operable at an operating temperature of at least 100° C.

16. The electrochemical cell of claim 15, wherein at least one, or both, of said anode catalyst and said cathode catalyst is a platinum group metal-free catalyst.

17. The electrochemical cell of claim 15, wherein said anode catalyst features an exchange current density lower than 0.05 mA/cm$^2$ at 25° C.; and/or wherein said cathode catalyst features a kinetic current density lower than 0.50 mA/mg at 0.9 V and 25° C.

18. The electrochemical cell of claim 15, wherein at least one, or both, of said anode compartment and said cathode compartment is devoid of an ionomer and/or further comprise an ionomer, wherein an amount of said ionomer is lower than 20% by weight of the total weight of the catalyst and/or a conductivity of said ionomer is lower than 50 mS/cm.

19. The anion exchange membrane electrode assembly of claim 11, wherein at least one, or both, of said anode and cathode electrodes exhibit closed porosity.

* * * * *